US007796607B2

(12) United States Patent
Gerber et al.

(10) Patent No.: US 7,796,607 B2
(45) Date of Patent: Sep. 14, 2010

(54) SCALABLE MULTIPROTOCOL LABEL SWITCHING BASED VIRTUAL PRIVATE NETWORKS AND METHODS TO IMPLEMENT THE SAME

(75) Inventors: Alexandre Gerber, Madison, NJ (US); Subhabrata Sen, Providence, NJ (US); Carsten Lund, Berkeley Hts, NJ (US); Dan Pei, Jersey City, NJ (US); MohammadTaghi Hajiaghayi, Highland Park, NJ (US); Changhoon Kim, Princeton, NJ (US)

(73) Assignees: AT&T Intellectual Property I, L.P., Reno, NV (US); Trustees of Princeton University, Princeton, NJ (US)

( * ) Notice: Subject to any disclaimer, the term of this patent is extended or adjusted under 35 U.S.C. 154(b) by 315 days.

(21) Appl. No.: 12/130,329

(22) Filed: May 30, 2008

(65) Prior Publication Data

US 2009/0296714 A1 Dec. 3, 2009

(51) Int. Cl.
*H04L 12/28* (2006.01)
*H04L 12/56* (2006.01)
(52) U.S. Cl. .............. 370/395.31; 370/254; 370/395.5; 370/395.3; 370/395.1; 370/389; 370/351; 709/238
(58) Field of Classification Search .............. 370/395.5, 370/395.31, 395.3, 395.1, 389, 351, 241, 370/252, 254, 401; 379/272, 277; 709/238–244; 711/221

See application file for complete search history.

(56) References Cited

U.S. PATENT DOCUMENTS 6,772,226 B1 * 8/2004 Bommareddy et al. ...... 709/245

| 6,789,121 | B2 * | 9/2004 | Lamberton et al. .......... 709/227 |
|---|---|---|---|
| 7,200,114 | B1 | 4/2007 | Tse-Au |
| 7,376,084 | B2 * | 5/2008 | Raghunath et al. .......... 370/233 |
| 7,489,635 | B2 | 2/2009 | Evans et al. |
| 7,564,802 | B2 * | 7/2009 | Andrapalliyal et al. ...... 370/254 |
| 2006/0239199 | A1 * | 10/2006 | Blair et al. .................. 370/248 |
| 2008/0298250 | A1 | 12/2008 | Larsson |
| 2009/0180600 | A1 | 7/2009 | Blackwell et al. |

OTHER PUBLICATIONS

S. Raghunath, K. K. Ramakrishnan, S. Kalyanaraman, C. Chase, "Measurement Based Characterization and Provisioning of IP VPNs", In Proc. Internet Measurement Conference, Oct. 2004 (14 pages).

(Continued)

*Primary Examiner*—William Trost, IV
*Assistant Examiner*—Kyle C Kasparek
(74) *Attorney, Agent, or Firm*—Hanley, Flight & Zimmerman, LLC

(57) ABSTRACT

Example scalable multi-protocol label switching (MPLS) based virtual private networks (VPNs) and methods to implement the same are disclosed. A disclosed example spoke provider edge (PE) router for an MPLS-based VPN includes a truncated virtual routing and forwarding (VRF) table containing a first value referencing a hub PE router and a second value referencing a first customer edge (CE) router coupled to the VPN via the PE router, and a forwarding module to forward a packet received from the first CE router to the hub PE router when the packet contains an address referencing a second CE router coupled to the VPN via a second spoke PE router.

12 Claims, 13 Drawing Sheets

OTHER PUBLICATIONS

S. Raghunath, S. Kalyanaraman, K. K. Ramakrishnan, "Trade-offs in Resource Management for Virtual Private Networks", In Proc. IEEE INFOCOM, Mar. 2005 (11 pages).

Bryan Ford, "Unmanaged Internet Protocol Taming the Edge Network Management Crisis", In ACM Computer Communication Review, vol. 34, pp. 93-98, 2004 (6 pages).

X. Zhang, P. Francis, J. Wang, K. Yoshida, "Scaling IP Routing with the Core Router-Integrated Overlay", In Proc. International Conference on Network Protocols, 2006 (10 pages).

Cisco 1200 Series Internet Router Architecture: Memory Details, downloaded from http://www.cisco.com/en/US/products/hw/routers/ps167/products_tech_note09186a00801e1dbe.shtml, Jul. 7, 2005 (6 pages).

U.S. IP VPN Services 2007-2011 Forecast, downloaded from http://www.idc.com/getdoc.jsp?containerId=210128, Dec. 2007 (1 page).

U.S. IP VPN Services 2006-2010 Forecast, downloaded from http://www.marketresearch.com/product/display.asp?productid=1330169&g=1, May 24, 2006 (1 page).

U.S. Appl. No. 12/563,815, entitled "Methods and Apparatus to Implement Scalable Routing in Network Communication Systems," filed Sep. 21, 2008 (65 pages).

Bryan Ford, "Unmanaged Internet Protocol Taming the Edge Network Management Crisis", In ACM Computer Communication Review, vol. 34, pp. 93-98, 2004, 6 pages.

S. Raghunath, S. Kalyanaraman, K. K. Ramakrishnan, "Trade-offs in Resource Management for Virtual Private Networks", In Proc. IEEE INFOCOM, Mar. 2005, 11 pages.

S. Raghunath, K. K. Ramakrishnan, S. Kalyanaraman, C. Chase, "Measurement Based Characterization and Provisioning of IP VPNs", In Proc. Internet Measurement Conference, Oct. 2004, 14 pages.

X. Zhang, P. Francis, J. Wang, K. Yoshida, "Scaling IP Routing with the Core Router-Integrated Overlay", In Proc. International Conference an Network Protocols, 2006, 10 pages.

Cisco 1200 Series Internet Router Architecture: Memory Details, downloaded from http://www.cisco.com/en/US/products/hw/routers/ps167/products_tech_note09186a00801e1dbe.shtml, Jul. 7, 2005, 6 pages.

U.S. IP VPN Services 2006-2010 Forecast, downloaded from http://www.marketresearch.com/product/display.asp?productid=1330169& g=1, May 24, 2006, 1 page.

U.S. IP VPN Services 2007-2011 Forecast, downloaded from http://www.idc.com/getdoc.jsp?containerId=210128, Dec. 2007, 1 page.

* cited by examiner

```
1:  // Build "serve-use" relationship
2:  ∀i (1 ≤ i ≤ |P|), $S_i \leftarrow \emptyset, U_i \leftarrow \emptyset$
3:  for i ← 1 to |P| do
4:      for s ← 1 to |P| do
5:          is_valid ← true
6:          for d ← 1 to |P| do
7:              if $c_{s,d} = 1$ and $l_{s,i} + l_{i,d} - l_{s,d} > \theta$ then
8:                  is_valid ← false
9:              end if
10:         end for
11:         if is_valid = true then
12:             $S_i \leftarrow S_i \cup \{s\}, U_s \leftarrow U_s \cup \{i\}$
13:         end if
14:     end for
15: end for
16:
17: // Run a greedy algorithm to choose hubs
18: loop
19:     if ∀i, $S_i = \emptyset$ then
20:         return;
21:     end if
22:     choose i with the largest $|S_i|$
23:     for each $j \in S_i$ do
24:         $M(p_j) \leftarrow p_i$
25:         for each $k \in U_j$ do
26:             $S_k \leftarrow S_k - \{j\}$
27:         end for
28:     end for
29: end loop
```

FIG. 12

1: // Build "serve-use" relationships along with penalties ($X_i$)
2: $\forall i\ (1 \leq i \leq |P|),\ S_i \leftarrow \emptyset, U_i \leftarrow \emptyset\ X_i \leftarrow 0$
3: for $i \leftarrow 1$ to $|P|$ do
4:   for $s \leftarrow 1$ to $|P|$ do
5:     $is\_valid \leftarrow$ true
6:     for $d \leftarrow 1$ to $|P|$ do
7:       $X_i \leftarrow X_i + v_{s,d} \cdot (l_{s,M(s)} + l_{M(s),d} - l_{s,d})$
8:       if $c_{s,d} = 1$ and $l_{s,i} + l_{i,d} - l_{s,d} > \theta$ then
9:         $is\_valid \leftarrow$ false
10:       end if
11:     end for
12:     if $is\_valid =$ true then
13:       $S_i \leftarrow S_i \cup \{s\},\ U_s \leftarrow U_s \cup \{i\}$
14:     end if
15:   end for
16: end for
17:
18: // Run a greedy algorithm to choose hubs
19: loop
20:   if $\forall i, S_i = \emptyset$ then
21:     return;
22:   end if
23:   $\forall i$ whose $S_i \neq \emptyset$, choose $i$ with the smallest $X_i$
24:   for each $j \in S_i$ do
25:     $M(p_j) \leftarrow p_i$
26:     for each $k \in U_j$ do
27:       $S_k \leftarrow S_k - \{j\}$
28:     end for
29:   end for
30: end loop

FIG. 16

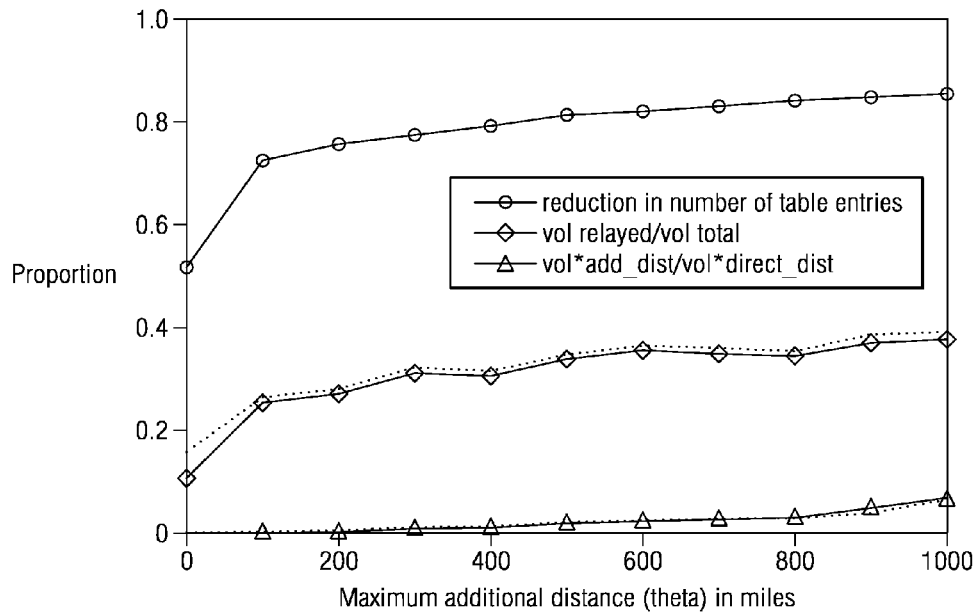

FIG. 17

```
COMPUTEASSIGNMENT
    while there is an unassigned PE router do
        set BestRatio= ∞, BestSet=∅, BestHub=0
        for i = 1 to n do
1805 {    let $S_i$ be the set of all unassigned PE routers $s$ (including $i$ itself, if unassigned)
              for which $i$ is a feasible hub, i.e., $l_{s,i} + l_{i,d} - l_{s,d} \leq \theta$ ∀s, d whose $c_{s,d} = 1$
1810 — sort $S_i$ according to cost($s$) = max{0, $\Sigma_d$ $v_{s,d} \cdot (l_{s,i} + l_{i,d} - l_{s,d})$} for $s \in S_i$
1815 — let $s_{ij}$ be the router with $j$th minimum cost in $S_i$
        set CurrentSet= ∅, CurrentCost= $F$
        for $j$ = 1 to Cap do
1820 — set CurrentSet= CurrentSet∪ {$s_{ij}$}, CurrentCost= CurrentCost+cost($s_{ij}$)
1825 {  if BestRatio> CurrentCost/$j$ then
              set BestRatio= CurrentCost/$j$, BestSet=CurrentSet, BestHub= $i$
        assign BestSet to BestHub
```

FIG. 18

SCALABLE MULTIPROTOCOL LABEL SWITCHING BASED VIRTUAL PRIVATE NETWORKS AND METHODS TO IMPLEMENT THE SAME

FIELD OF THE DISCLOSURE

This disclosure relates generally to multiprotocol label switching (MPLS) based virtual private networks (VPNs) and, more particularly, to scalable MPLS-based VPNs and methods to implement the same.

BACKGROUND

Enterprise customers are increasingly adopting MPLS-based VPN services to implement a communication network among their respective customer sites via a service provider's network. Such MPLS-based VPNs provide direct any-to-any reachability among an enterprise's customer sites.

BRIEF DESCRIPTION OF THE DRAWINGS

FIG. 12 illustrates example machine accessible instructions that may be executed by, for example, a processor to select hubs using a latency-constrained hub selection algorithm.

FIG. 16 illustrates example machine accessible instructions that may be executed by, for example, a processor to select hubs using a latency-constrained, volume-sensitive hub selection algorithm.

FIG. 17 illustrates example gains and costs resulting from selection of hubs using the example machine accessible instructions of FIG. 16.

FIG. 18 illustrates example machine accessible instructions that may be executed by, for example, a processor to select hubs using another example latency-constrained, volume-sensitive hub selection algorithm.

DETAILED DESCRIPTION

Figure 1:
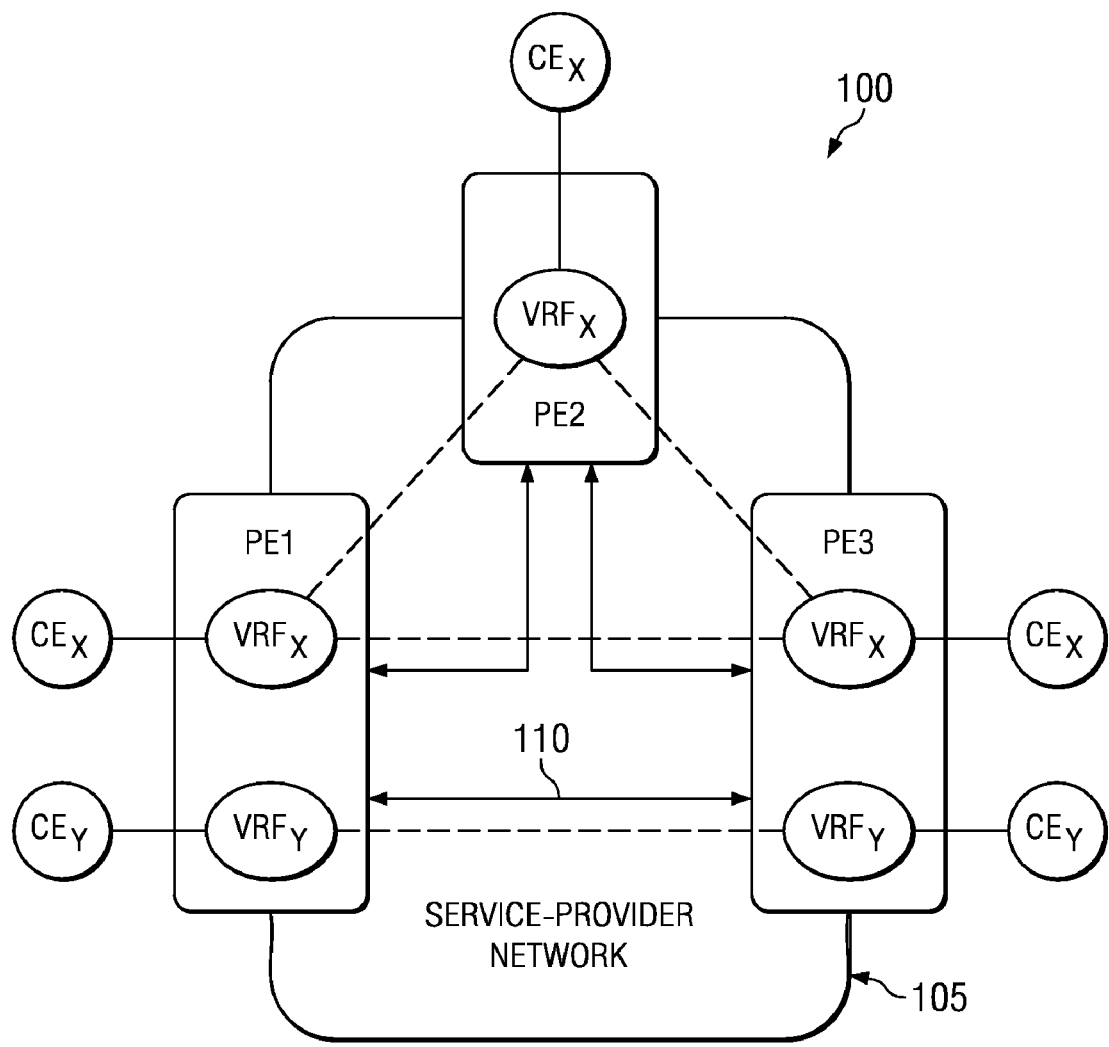
FIG. 1 is a schematic illustration of an example prior-art MPLS-based VPN.

Example scalable multi-protocol label switching (MPLS) based virtual private networks (VPNs) and methods to implement the same are disclosed. A disclosed example spoke provider edge (PE) router for an MPLS-based VPN includes a truncated virtual routing and forwarding (VRF) table containing a first value referencing a hub PE router and a second value referencing a first customer edge (CE) router coupled to the VPN via the PE router, and a forwarding module to forward a packet received from the first CE router to the hub PE router when the packet contains an address referencing a second CE router coupled to the VPN via a second spoke PE router.

A disclosed example method includes collecting traffic statistics from a plurality of PE routers of an MPLS-based VPN, and using the traffic statistics to select a first PE router of the plurality of PE routers as a hub router and a second PE router of the plurality of PE routers as a spoke router, the first PE router to have a full VRF table referencing a first set of CE routers coupled via the VPN, the second PE router to have a truncated VRF table referencing only the first PE router and any CE routers coupled to the VPN via the second PE router.

A disclosed example hub selector includes a traffic data collector to collect traffic statistics from a plurality of PE routers of an MPLS-based VPN, a hub selection module to select, based on the traffic statistics, a first PE router of the plurality of PE routers as a hub router and a second PE router of the plurality of PE routers as a spoke router, and a border gateway protocol (BGP) policy manager. In the disclosed example, the BGP policy manager is to configure the first PE router with a first policy that defines exporting a value representing the first PE router and a second value representing a CE router coupled to the VPN via the first PE router, and importing a third value representing a second CE router coupled to the VPN via the second PE router, and configure the second PE router with a second policy that defines exporting the third value, and importing the first value.

A disclosed example MPLS-based VPN includes a first PE hub router having a full VRF table containing a plurality of references to respective ones of a plurality of CE routers communicatively coupled via the VPN, a second PE spoke router having a first truncated VRF table containing a reference to the first PE hub router and a first set of references for respective ones of a first set of the plurality of CE routers coupled to the VPN via the second PE spoke router, and a third PE spoke router having a second truncated VRF table containing the reference to the first PE hub router and a second set of references for respective ones of a second set of the plurality of CE routers coupled to the VPN via the third PE spoke router, the third PE spoke router to forward a packet received from one of the second set of the plurality of CE routers to one of the first set of the plurality of CE routers via the first PE hub router based on the reference to the first PE hub router.

In the interest of brevity and clarity, throughout the following disclosure references will be made to the example scalable MPLS-based VPN network 300 of FIG. 3. However, the methods and apparatus described herein to implement a scalable network (VPN and/or otherwise) are applicable to other types of networks constructed using other network technologies, topologies and/or protocols.

FIG. 1 illustrates an example prior-art MPLS-based VPN network 100. To facilitate communication between a plurality of CE routers CE$_x$ and CE$_y$, the example MPLS-based VPN 100 of FIG. 1 includes a service-provider network 105. The example service-provider network 105 of FIG. 1 includes a plurality of PE routers, three of which are designated at reference numerals PE1, PE2 and PE3. The example PE routers PE1, PE2, and PE3 of FIG. 1 are communicatively coupled to each other via a plurality of communication paths (one of which is designated at reference numeral 110) that allow any of the PE routers PE1, PE2 and/or PE3 to communicate directly with any of the other PE routers PE1, PE2 and PE3.

For each VPN implemented by the service-provider network 105 (e.g., a VPN$_x$ communicatively coupling the CE$_x$ routers), each of the example PE routers PE1, PE2 and PE3 of FIG. 1 has a VRF table (e.g., VRF$_x$ for the VPN$_x$ coupling the CE$_x$ routers). The VRF table defines which PE router(s) PE1-PE3 are used to communicatively couple the CE routers to the VPN. As described below in connection with FIG. 2, the VRF tables are used by the PE routers PE1-PE3 to route and/or forward a packet received at a particular PE router PE1, PE2 or PE3 to its final destination.

Figure 2:
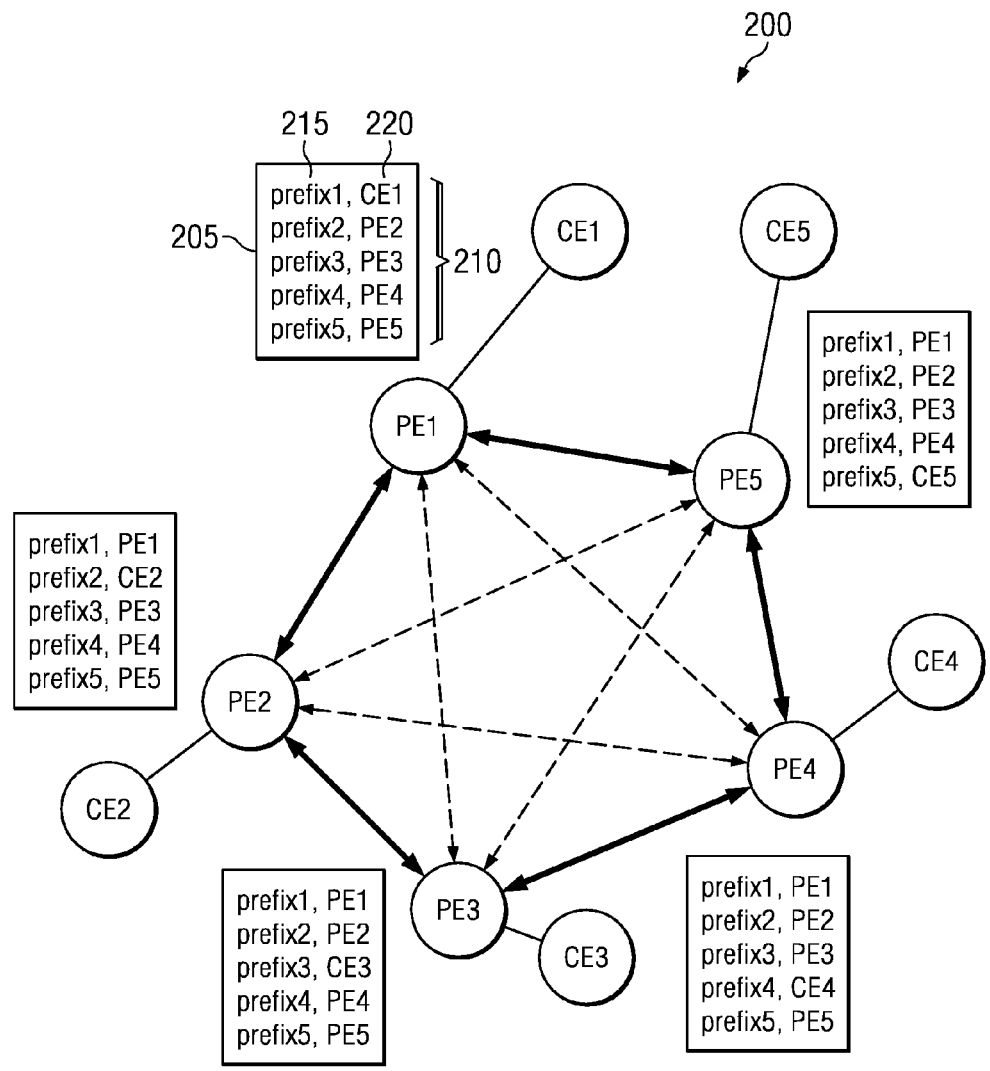
FIG. 2 is a schematic illustration of example prior-art virtual routing and forwarding tables for an MPLS-based VPN.

FIG. 2 illustrates an example MPLS-based VPN 200 constructed using five PE routers PE1-PE5. Each of the PE routers PE1-PE5 has a respective CE router CE1-CE5 that is communicatively coupled to the VPN 200 via its corresponding PE router PE1-PE5. While for ease of discussion, only one VPN 200 is shown in FIG. 2, any number of VPNs can be constructed via the example PE routers PE1-PE5. Moreover, more than one CE router could be connected to any of the PE routers PE1-PE5. Further, a CE router CE1-CE5 could be connected to more than one PE router PE1-PE5 for load balancing or backup purposes.

Each of the example PE routers PE1-PE5 of FIG. 2 has an associated VRF table, one of which is designated at reference numeral 205 in FIG. 2. Each of the example VRF tables 205 of FIG. 2 contains a plurality of entries 210 for respective ones of the CE routers (e.g., CE1-CE5) communicatively coupled via the VPN 200. In the illustrated example of FIG. 2, each of the VRF tables 205 contains an entry 210 for each of the CE routers CE1-CE5 of the VPN 200. By having an entry 210 for each of the CE routers CE1-CE5, the example PE routers PE1-PE5 of FIG. 2 implement direct any-to-any communication amongst the CE routers CE1-CE5.

To identify a particular CE router CE1-CE5, each of the example entries 210 of FIG. 2 includes a prefix field 215. Each of the example prefix fields 215 of FIG. 2 contains one or more numbers and/or letters that represent all or a portion of an address and/or label that uniquely identifies a particular CE router CE1-CE5.

To identify how a packet addressed to a particular CE router CE1-CE5 is to be routed, each of the example entries 210 of FIG. 2 includes a reference field 220. Each of the example reference fields 220 of FIG. 2 contains one or more numbers and/or letters that represent the MPLS label of a CE router CE1-CE5 or a PE router PE1-PE5.

When a packet is received at a PE router PE1-PE5 from a CE router CE1-CE5, the PE router PE1-PE5 uses the final destination of the packet to perform a query of its VRF table 205. The PE router PE1-PE5 performs the query by comparing the final destination address or label contained in a header of the packet with the prefix fields 215. Based on the query, the PE router PE1-PE5 determines how the packet is to be routed or forwarded. If the reference field 220 contains a reference to another PE router PE1-PE5, the PE router PE1-PE5 prepends an MPLS label corresponding to the identified PE router PE1-PE5 to the packet, and forwards the prepended packet to the identified PE router PE1-PE5. If the reference field 220 contains a reference to a CE router CE1-CE5 communicatively coupled to the VPN, the PE router PE1-PE5 routes the packet to the CE router CE1-CE5 without prepending an MPLS label.

When a packet is received at a PE router PE1-PE5 from another PE router PE1-PE5, the PE router PE1-PE5 removes the prepended MPLS label, performs a query of its VRF table 205 to identify whether the CE router CE1-CE5 to which the packet is addressed is coupled to the VPN via the PE router PE1-PE5. If the identified CE router CE1-CE5 is coupled to the VPN via the PE router PE1-PE5, the PE router PE1-PE5 delivers the packet to the identified CE router CE1-CE5

Figure 3:
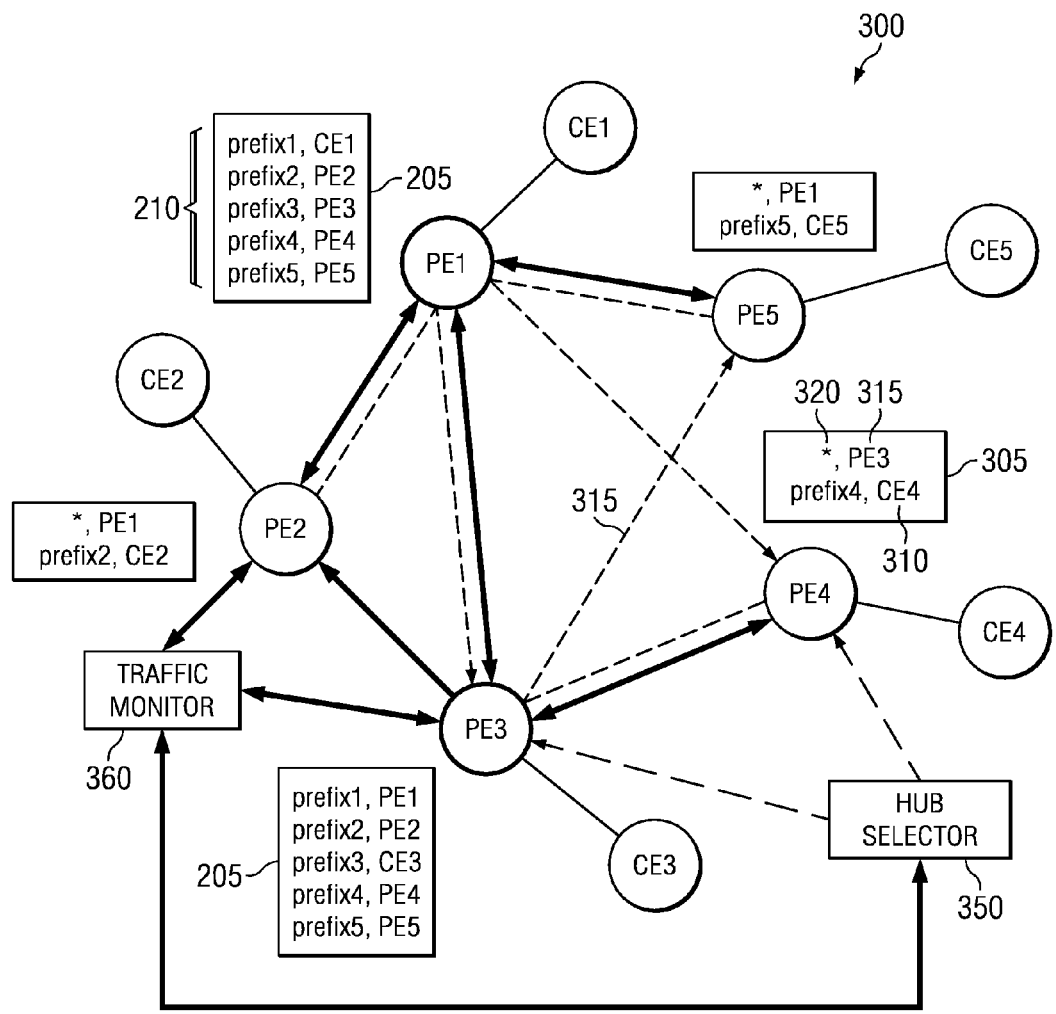
FIG. 3 is a schematic illustration of an example scalable MPLS-based VPN constructed in accordance with the teachings of this disclosure.

FIG. 3 illustrates an example MPLS-based VPN 300 constructed in accordance with the teachings of the disclosure. The example MPLS-based VPN 300 of FIG. 3 has the same configuration of PE routers PE1-PE5 and CE routers CE1-CE5 described above in connection with FIG. 2. Like the example VPN 200 of FIG. 2, two of the example PE routers (i.e., routers PE1 and PE3) of FIG. 3 have VRF tables 205 that contain an entry 210 for each of the CE routers CE1-CE5 of the VPN 300. Routers such as PE1 and PE3 that have complete VRF tables are referred to herein as "hub routers." The remaining PE routers (i.e., routers PE2, PE4 and PE5) are referred to herein as "spoke routes." The spoke routers have VRF tables (one of which is designated at reference numeral 305) that do not contain an entry for every CE router in the VPN 300. Instead, these VRF tables (referred to herein as "truncated VRF tables") contain one or more entries (one of which is designated at reference numeral 310) that reference the CE router(s) communicatively coupled to the spoke PE routers corresponding to the truncated VRF tables (e.g., router PE2, PE4, or PE5), and an entry 315 that references one or the hub routers PE1, PE3. The example entry 315 has a prefix field 320 of "*" to indicate that the entry corresponds to a default entry to be used for a destination that does not match one of the entries 310 (i.e., does not correspond to a CE router CE1-CE5 coupled to the spoke router PE4).

Because the example spoke routers PE2, PE4 and PE5 of FIG. 3 do not have VRF tables 305 that contain references to all of the CE routers CE1-CE5, the example MPLS-based VPN 300 of FIG. 3 is defined to operate in a logical hub and spoke arrangement. As noted above, the PE routers PE1 and PE3 of FIG. 3 are configured and/or selected to operate as hub routers, and the PE routers PE2, PE4 and PE5 of FIG. 3 are configured and/or selected to operate at spoke routers. A spoke router PE2, PE4 and PE5 only communicates (1) with its associated CE routers (i.e., those CE routers that are coupled to the VPN 300 via the spoke router) and (2) with a corresponding hub router PE1, PE3. For a packet received at a spoke router PE2, PE4, PE4 that is not addressed to a CE router associated with the spoke router PE2, PE4, PE5, the spoke router PE2, PE4, PE5 forwards the packet via its associated hub router PE1, PE3. For example, a packet addressed to CE5, which is received from CE4 at spoke router PE4, is relayed via the hub router PE3 to the spoke router PE5 (as signified by line 315), because the hub router PE3 is designated in the truncated VRF of the spoke router PE4. Even though some packets are delivered indirectly or relayed through a hub router PE1, PE3, each CE router CE1-CE5 is still able to communicate with any of the CE routers CE1-CE5. Because each of the hub routers PE1, PE3 maintains a full or complete VRF table referencing all of the CE routers CE1-CE5 of the VPN 300, multi-hop delivery across multiple hub routers PE1, PE3 is not required.

While it might be expected that the hub and spoke router architecture described above would result in excess inter-node backbone traffic, as demonstrated below in connection with FIGS. 9, 10, 13, 14, and 17, by configuring the example MPLS-based VPN 300 of FIG. 3 to use relaying to transport some packets, the amount of memory required to implement VRF tables 205 and 305 for the PE routers PE1-PE5 can be reduced by up to nearly 90%, while increasing the additional distances traversed by packets by only a few hundred miles and the backbone bandwidth usage by less than 10%. Moreover, the example relaying system of FIG. 3 may be implementing without extensive hardware updating and replacement by using existing PE routers and/or MPLS-based VPNs and re-configuring the PE routers with new BGP configurations and/or policies. An example BGP policy is described below in connection with FIG. 4. Further, the use of relaying in the example MPLS-based VPN 300 of FIG. 3 is substantially transparent to customers since the hub routers PE1, PE3 directly handle the relaying of traffic without a need to forward the packets to a locally-attached customer site. As such, relaying is performed by the example VPN 300 of FIG. 3 without a need to modify customer site equipment.

Memory savings are critical to the scalability of MPLS-based VPNs. For example, consider a typical prior-art PE router implemented using a network interface card (NIC) having 622 Mbps of bandwidth that can be channelized into three hundred and thirty-six 1.544 Mbps ports. Such a NIC can support 336 different customer sites. It is not unusual for an enterprise to have hundreds or thousands of sites. Consider a convenience store chain having 7,200 stores, and a single PE router serving one of the stores via one of its ports. Since each of the 7,200 stores announces at least two routes (one for the customer site and the other for the link connecting the site to the backbone), that single PE router must maintain a full VRF table having at least 14,400 entries. However, a state-of-the-art NIC can store at most 1 million routes, and commonly used NICs store only 200,000 to 300,000 routes. Thus, the convenience store chain consumes 7.2% (14,400/200,000) of the memory of a standard prior-art NIC while consuming at most 0.3% (1/366) of the bandwidth of the NIC. Moreover, 14 such convenience store chains would consume all of the memory of the NIC while only consuming 14 of the 366 available ports. For at least these reasons, the substantially memory savings that may be achieved by the example MPLS-based VPN 300 of FIG. 3 are significant and dramatically improve how efficiently resources of the MPLS-based VPN 300 are utilized. In particular, the hub(s) and spoke(s) approach disclosed herein reduces the memory requirements placed on a NIC in the chain store example discussed above to be more consistent with the bandwidth usage of the NIC by those chain stores (e.g., a 90% reduction of 7.2% reduces the memory load of the stores to 0.72% which is much closer to the 0.3% bandwidth usage in the above example).

While the example hub routers PE1 and PE3 have full VRF tables 205 containing references to all of the CE routers CE1-CE5 in the VPN 300, additional memory savings may be achieved by having hub routers PE1, PE3 only store references to a portion of the CE routers CE1-CE5 (but together the hub routers PE1, PE3 reference all of the CE routers CE1-CE5). However, such a partitioning of CE routers CE1-CE5 among the hub routers PE1 and PE3 may require use of a consistency protocol among the PE routers PE1-PE5.

To select which of the PE routers PE1-PE5 are to operate as hub routers and which are to operate as spoke routers, the example MPLS-based VPN 300 of FIG. 3 includes a hub selector 350 and a traffic monitor 360. The example traffic monitor 360 of FIG. 3 monitors the links connecting each PE router PE1-PE5 to its adjacent router(s) PE1-PE5 using, for example, the Cisco Systems NetFlow Services Export protocol. Records collected by the example traffic monitor 360 allow the source, destination and volume of flows to be measured and/or recorded. Traffic data may be collected by the traffic monitor 360 over any interval(s) of time, such as weeks.

Using the traffic data collected by the example traffic monitor 360, the example hub selector 350 of FIG. 3 selects which of the PE routers PE1-PE5 are to serve as hub routers PE1, PE3. In some examples, the hub selector 350 also assigns a hub router PE1, PE3 to each of the spoke routers PE2, PE4, PE5. The example hub selector 350 selects hub routers PE1, PE3 to satisfy one or more constraints, criteria and/or principles. In general, the hub selector 350 selects the smallest feasible set of hub routers PE1, PE3 subject to indirection constraints and/or penalties, such as, maximum additional latency, maximum amount of relayed traffic, etc. In some examples, it is desirable that indirection penalties be insignificant in the average case and bounded in the worst case. To improve network reliability, at least two hub routers PE1, PE3 are selected for the VPN 300, and the hub routers PE1, PE3 are preferably selected to be located at different points of presences (POPs). Because each hub router PE1, PE3 advertises its default route, were a particular hub router PE1, PE3 to fail, the spoke routers PE2, PE4, PE5 are able to quickly and/or automatically switch over to a remaining hub router PE1, PE3. Example methods and/or algorithms that may be used to select hub routers are described below in connection with FIGS. 9-18.

When an MPLS-based backbone implements more than one VPN, each of the VPNs may use different PE routers PE1-PE5 as hub routers. When a CE router CE1-CE5 is coupled to more than one PE router PE1-PE5 for backup or load sharing reasons, all of the PE routers PE1-PE5 coupled to the CE router CE1-CE5 are selected as hub or spoke routers so that all of the PE routers PE1-PE5 announce the same route(s) to the CE router CE1-CE5. When a CE router CE1-CE5 announces a default route on its own (e.g., to provide Internet gateway services to other sites), the PE routers PE1-PE5 communicatively coupled to the CE router CE1-CE5 are chosen as hub routers.

Based upon the selection of hub and spoke routers, the example hub selector 350 of FIG. 3 installs, configures and/or provisions corresponding BGP policies and/or configurations into the PE routers PE1-PE5. Example BGP policies are described below in connection with FIG. 4. The example hub selector 350 may periodically (e.g., once a week) or aperiodically (e.g., upon occurrence of an event) update or change which of the PE routers PE1-PE5 are selected and/or configured as hub routers and which are configured as spoke routers for a given VPN. This allows the MPLS-based VPN 300 of FIG. 3 to be adapted and/or re-optimized over time as traffic patterns change. Updating hub selections more frequently (e.g., once a week) and using full-mesh communication matrices (described below) tend to lead to more stability (e.g., fewer changes in which of the routers PE1-PE5 are selected as hub routers).

While the hub selector 330 selects the hub routers, the spoke routers may be programmed to select the hub router with which they are affiliated. The example spoke routers (e.g., the routers PE2, PE4, PE5) of FIG. 3 select the closest hub router (e.g., one of the routers PE1, PE3) using Interior Gateway Protocol (IGP) distances. However, hub router selection may be performed using other algorithms. For example, a spoke router PE2, PE4, PE5 may randomly select a hub router PE1, PE3 from a list of advertised hub routers PE1, PE3. Alternatively or additionally, a spoke router PE2, PE4, PE5 may have a hub router PE 1, PE3 assigned by the example hub selector 350 to optimize a routing characteristic (e.g., minimize an additional routing distance penalty). While the IGP distance selects the closest hub router PE1, PE3 rather than the most popular communication peer, simulations have shown that on average the two methods perform similarly.

Figure 4:
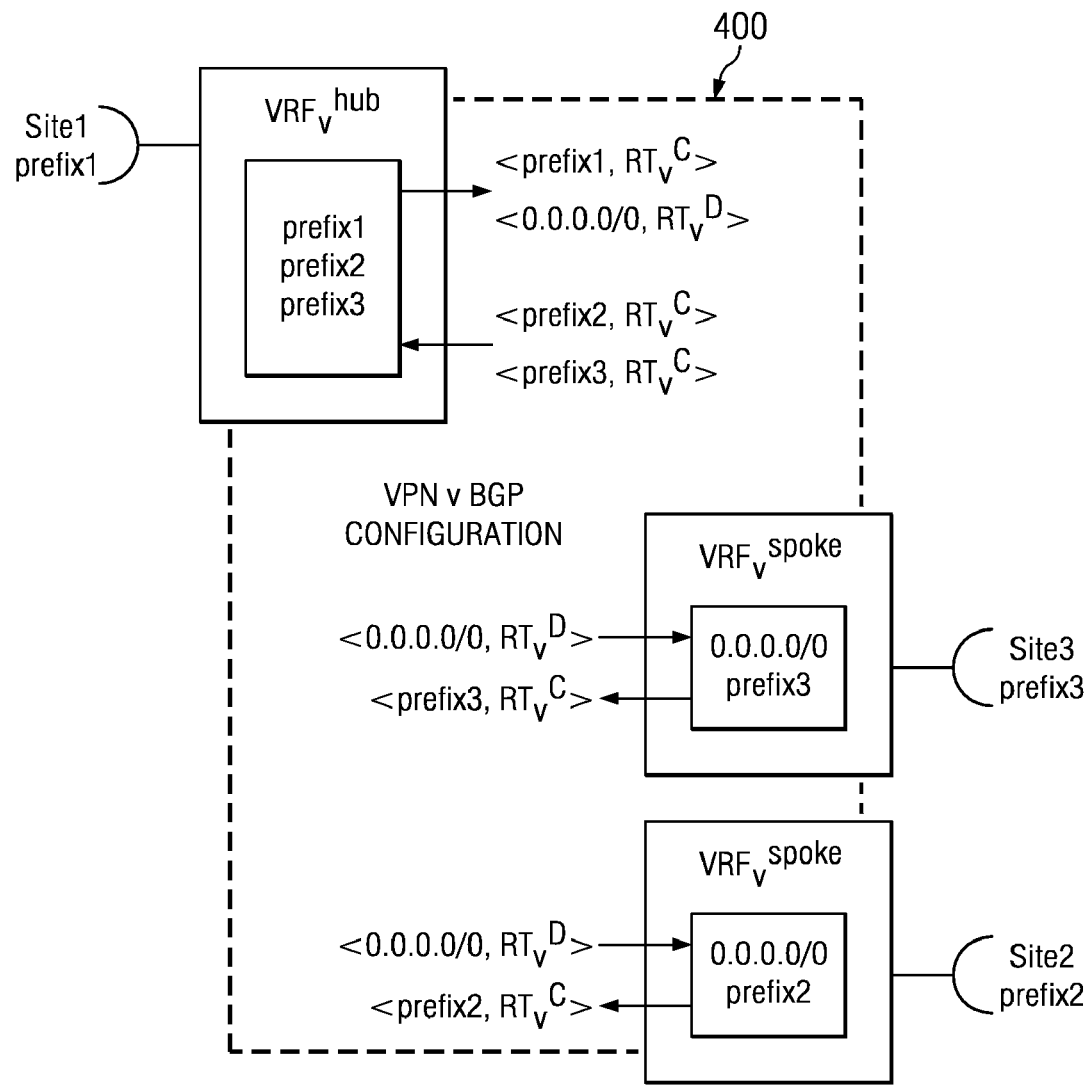
FIG. 4 illustrates an example border gateway protocol (BGP) configuration for the example MPLS-based VPN of FIG. 3.

FIG. 4 illustrates an example BGP configuration 400 for the example MPLS-based VPN 300 of FIG. 3. The example PE routers PE1-PE5 of FIGS. 2 and 3 use BGP to disseminate, announce and/or advertise CE router prefixes. For scalability, the PE routers PE1-PE5 multiplex route updates of different VPNs over a set of shared BGP sessions established among the PE routers PE1-PE5. Isolation between the different VPNs is achieved via route targets (RTs) and import policies. Specifically, all routes of a first VPN v are tagged with its own route target $RT_v$ when they are advertised. When the example PE routers PE1-PE5 receive route targets tagged with $RT_v$, they import those routes only into the first VPN v's VRF table $VRF_v$ as dictated by VPN v's import policy.

In the example BGP policy 400 of FIG. 4, each VPN v has (a) two RTs to distinguish customer routes from a default route (0.0.0.0/0), and (b) different import policies for hub routers (e.g., routers PE1 and PE3) and spoke routers (e.g, routers PE2, PE4 and PE5). As shown in FIG. 4, each example PE router PE1-PE5 of FIG. 3 in VPN v, regardless of whether a hub or spoke, advertises its customer routes via $RT_v^c$. Each of the example hub routers PE1, PE3 of FIG. 3 advertise a default route via $RT_v^d$. Upon receiving updates, the example spoke routers PE2, PE4, PE5 of FIG. 3 import routes tagged with $RT_v^d$, and the example hub routers PE1 and PE3 import routes tagged with $RT_v^c$ and $RT_v^d$. As a result of these import policies, each of the truncated VRF tables $VRF_v^{spoke}$ of the example spoke routers PE2, PE4, PE5 is populated only with the default routes advertised by the hub routers PE1, PE3 and the routes of locally attached customer sites. Contrastingly, the full VRF table $VRF_v^{hub}$ of the hub routers PE1 and PE3 contain all customer routes in the example VPN 300. While the example BPG policy 400 of FIG. 4 defines two RTs ($RT_v^c$ and $RT_v^d$) for the example VPN v, any number of RTs may be used to define export and/or import policies for a VPN. For example, a third RT could be defined to create direct connectivity between two or more specific sites to, for example, guarantee a certain end-to-end latency for communication between or among the specific sites.

In the illustrated example of FIG. 4, each of the spoke routers PE2, PE4, PE5 selects a hub router PE1, PE3 based on IGP distances. In other examples, to implement a specific hub assignment plan, the example hub selector 350 of FIG. 3 customizes the import policy of each $VRF_v^{spoke}$.

While an example MPLS-based VPN 300 has been illustrated in FIGS. 3 and 4, the devices, networks, systems, servers and/or processors illustrated in FIGS. 3 and 4 may be combined, divided, re-arranged, eliminated and/or implemented in any way. Further, the example PE routers PE1-PE5, the example hub selector 350, the example traffic monitor 360 and/or, more generally, the example MPLS-based VPN 300 may be implemented by hardware, software, firmware and/or any combination of hardware, software and/or firmware. Thus, for example, any or all of the example PE routers PE1-PE5, the example hub selector 350, the example traffic monitor 360 and/or, more generally, the example MPLS-based VPN 300 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example PE routers PE1-PE5, the example hub selector 350, the example traffic monitor 360 and/or, more generally, the example MPLS-based VPN 300 are hereby expressly defined to include a tangible medium such as a memory, a digital versatile disc (DVD), a compact disc (CD), etc. storing the software and/or firmware. Further still, the example MPLS-based VPN 300 may include additional devices, networks, systems, servers and/or processors in addition to, or instead of, those illustrated in FIG. 3 and/or may include more than one of any or all of the illustrated devices, networks, systems, servers and/or processors.

Figure 5:
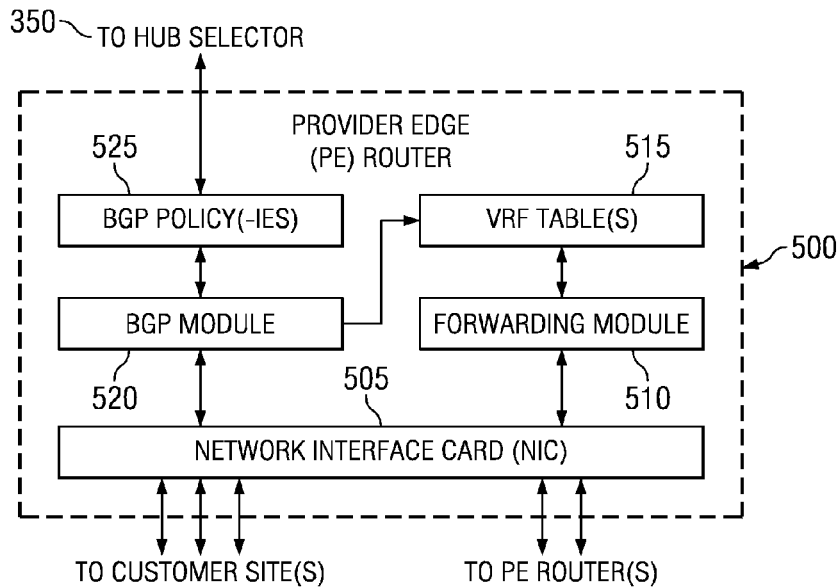
FIG. 5 illustrates an example manner of implementing an example provider edge (PE) router for the example MPLS-based VPN of FIG. 3.

FIG. 5 illustrates an example manner of implementing any or all of the example PE routers PE1-PE5 of FIG. 3. While any of the example PE routers PE1-PE5 of FIG. 3 may be implemented by the example device of FIG. 5, for ease of discussion, the device of FIG. 5 will be referred to as PE 500.

To implement interfaces to customer sites and to other PE routers, the example PE 500 of FIG. 5 includes any type(s) and/or number of NICs 505. An example NIC 505 has an aggregate bandwidth of 622 Mbps that can be channelized into, for example, three hundred and sixty-six 1.544 Mbps ports.

To handle packets, the example PE 500 of FIG. 5 includes a forwarding module 510. When a packet associated with a first VPN v is received, the example forwarding module 510 queries the VRF table 515 associated with the first VPN v. The example forwarding module 510 performs the query by comparing the final destination address or label contained in a header of the packet with the prefix fields 215 of the VRF table 515. Based on the query, the forwarding module 510 determines how the packet is to be routed or forwarded. If the reference 220 identified via the query contains a reference to another PE router PE1-PE5, the forwarding module 510 prepends an MPLS label corresponding to the identified PE router PE1-PE5 to the packet, and forwards the prepended packet to the PE router PE1-PE5. If the identified reference identifies a CE router CE1-CE5 communicatively coupled to VPN v via the PE 500, the forwarding module 510 routes the packet to the CE router CE1-CE5 without prepending an MPLS label as there is no need to pass the packet through another PE router.

The example VRF table(s) 515 of FIG. 5 may be implemented using any number and/or type(s) of data structures, and may be stored using any number and/or type(s) of memory and/or memory devices.

To implement BGP, the example PE 500 of FIG. 5 includes any type of BGP module 520. Based on RTs, export policies and import policies 525 configured, defined and/or provisioned by the example hub selector 350 of FIG. 3 for a particular VPN v, the example BGP module 520 of FIG. 5 exports routes, imports, routes, and generally creates, updates and/or maintains the VRF table 515 for the VPN v, as described above in connection with FIG. 4. The example BGP policy(-ies) 525 of FIG. 5 may be implemented using any number and/or type(s) of data structures, and may be stored using any number and/or type(s) of memory and/or memory devices.

While an example manner of implementing any or all of the example PE routers PE1-PE5 of FIG. 3 has been illustrated in FIG. 5, one or more of the interfaces, data structures, elements, processes and/or devices illustrated in FIG. 5 may be combined, divided, re-arranged, omitted, eliminated and/or implemented in any other way. Further, the example NIC 505, the example forwarding module 510, the example VRF table(s) 515, the example BGP module 520, the example BGP policy(-ies) 525 and/or, more generally, the example PE 500 of FIG. 5 may be implemented by hardware, software, firmware and/or any combination of hardware, software and/or firmware. Thus, for example, any or all of the example NIC 505, the example forwarding module 510, the example VRF table(s) 515, the example BGP module 520, the example BGP policy(-ies) 525 and/or, more generally, the example PE 500 may be implemented by one or more circuit(s), programmable processor(s), ASIC(s), PLD(s) and/or FPLD(s), etc. When any of the appended claims are read to cover a purely software and/or firmware implementation, at least one of the example NIC 505, the example forwarding module 510, the example VRF table(s) 515, the example BGP module 520, the example BGP policy(-ies) 525 and/or, more generally, the example PE 500 are hereby expressly defined to include a tangible medium such as a memory, a DVD, a CD, etc. storing the firmware and/or software. Further still, a border element may include interfaces, data structures, elements, processes and/or devices instead of, or in addition to, those illustrated in FIG. 5 and/or may include more than one of any or all of the illustrated interfaces, data structures, elements, processes and/or devices.

Figure 6:
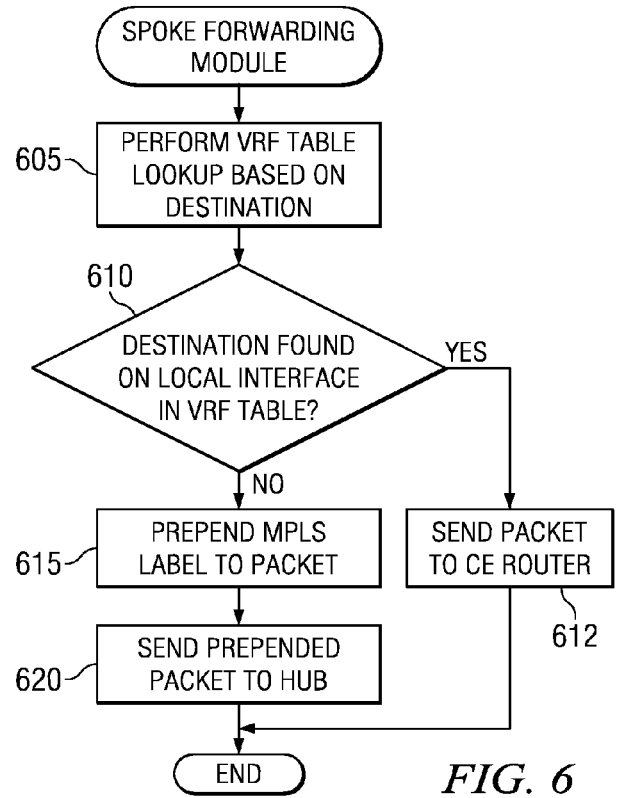
FIG. 6 is a flowchart representative of example machine accessible instructions that may be executed by, for example, a processor to implement an example forwarding module of a spoke PE router for the example MPLS-based VPN of FIG. 3.

FIG. 6 illustrates example machine accessible instructions that may be executed to implement the example forwarding module 510 for any of the example spoke routers PE2, PE4, and/or PE5 of FIG. 3. FIG. 8 illustrates example machine accessible instructions that may be executed to implement the example hub selection module 710 of FIG. 7. The example machine accessible instructions of FIGS. 6 and/or 8 may be carried out by a processor, a controller and/or any other suitable processing device. For example, the example machine accessible instructions of FIGS. 6 and/or 8 may be embodied in coded instructions stored on a tangible medium such as a flash memory, a read-only memory (ROM) and/or random-access memory (RAM) associated with a processor (e.g., the example processor P105 discussed below in connection with FIG. 19). Alternatively, some or all of the example machine accessible instructions of FIGS. 6 and/or 8 may be implemented using any combination(s) of ASIC(s), PLD(s), FPLD(s), discrete logic, hardware, firmware, etc. Also, some or all of the example machine accessible instructions of FIGS. 6 and/or 8 may be implemented manually or as any combination of any of the foregoing techniques, for example, any combination of firmware, software, discrete logic and/or hardware. Further, many other methods of implementing the example operations of FIGS. 6 and/or 8 may be employed. For example, the order of execution of the blocks may be changed, and/or one or more of the blocks described may be changed, eliminated, sub-divided, or combined. Additionally, any or all of the example machine accessible instructions of FIGS. 6 and/or 8 may be carried out sequentially and/or carried out in parallel by, for example, separate processing threads, processors, devices, discrete logic, circuits, etc.

The example machine accessible instructions of FIG. 6 begin when a packet is received at a spoke router (e.g., router PE2, PE4, or PE5 of FIG. 3). The example forwarding module 510 of FIG. 5 performs a query of one of its corresponding VRF tables 515 based on (a) the identification of the VPN in question (which may be identified based on the source and/or destination CE routers, and (b) a destination specified in the received packet (block 605). If the destination is found in the VRF table corresponding to the subject VPN (i.e., the packet is addressed to a customer site corresponding to the spoke router that received the packet (e.g., router PE2, PE4, PE5) (block 610), the forwarding module 510 sends the packet to the corresponding CE router (block 612). Control then exits from the example machine accessible instructions of FIG. 6.

If the destination was not found in the VRF table of the spoke router that is processing the packet (block 610), the forwarding module 510 prepends an MPLS label associated with a default route to the packet (block 615), and sends the packet and label (referred to herein as a "prepended packet") to a hub router PE 1, PE3 via the default route (block 620). Control then exits from the example machine accessible instructions of FIG. 6.

Figure 7:
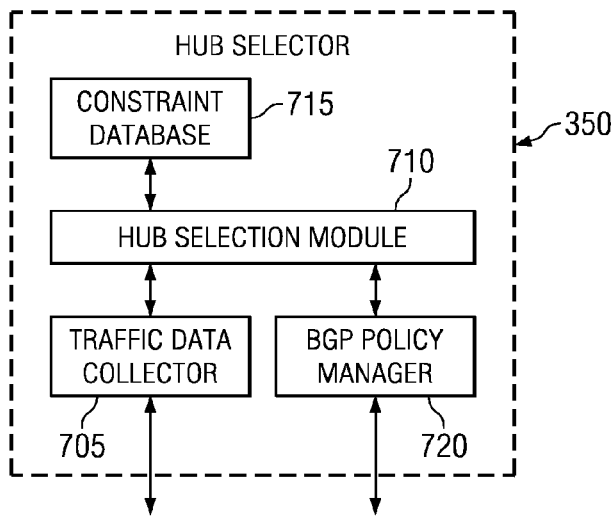
FIG. 7 illustrates an example manner of implementing an example hub selector for the example MPLS-based VPN of FIG. 3.
Figure 8:
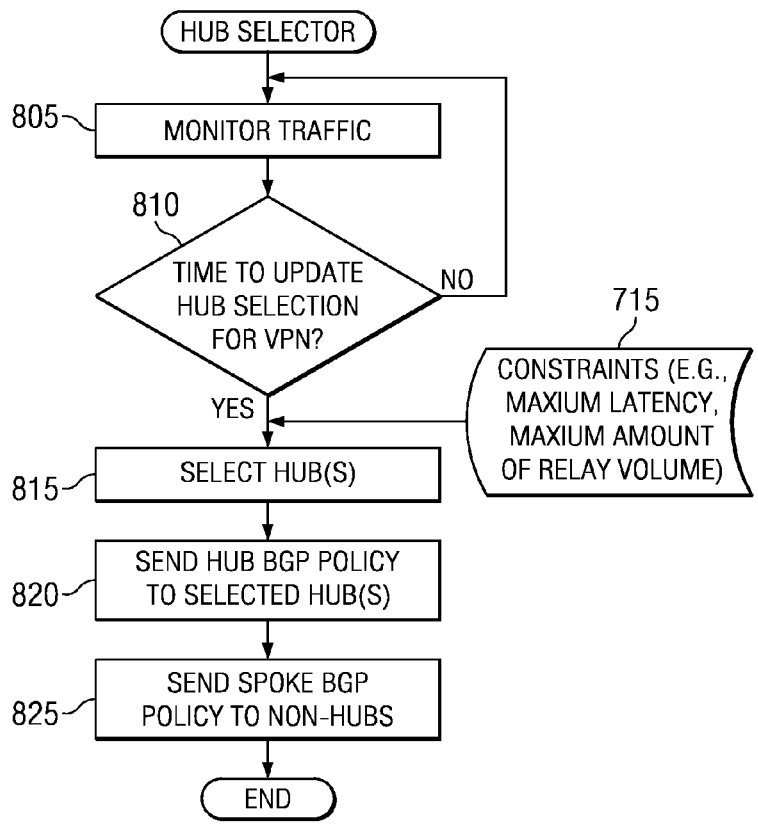
FIG. 8 is a flowchart representative of example machine accessible instructions that may be executed by, for example, a processor to implement any or all of the example hub selectors of FIGS. 3 and 7.

FIG. 7 illustrates an example manner of implementing the example hub selector 350 of FIG. 3. To collect traffic data, the example hub selector 350 of FIG. 7 includes a traffic data collector 705. The example traffic data collector 705 periodically or aperiodically collects traffic data measured and/or recorded by the example traffic monitor 360.

To select hub routers, the example hub selector 350 of FIG. 7 includes a hub selection module 710. Using the traffic data collected via the example traffic data collector 705, the example hub selection module 710 of FIG. 7 selects which of the example PE routers PE1-PE5 of FIG. 3 are to serve as hub routers PE1, PE3 for a particular VPN v. In general, the hub selector 350 selects the smallest feasible set of hub routers PE1, PE3 subject to indirection constraints and/or penalties 715, such as, maximum additional latency, maximum amount of relayed traffic, etc. In some examples, it is desirable that indirection penalties be insignificant in the average case and bounded in the worst case. Example methods and/or algorithms that may be used to select hub routers are described below in connection with EQN (1), EQN (2), EQN (3), EQN (4), EQN (5), and FIGS. 11, 12, 15, 16 and 18. The example hub selection module 710 may periodically (e.g., once a week) or aperiodically (e.g., upon occurrence of an event) update or change which of the PE routers PE1-PE5 are selected and/or configured as hub routers. This allows the MPLS-based VPN 300 of FIG. 3 to be adapted and/or re-optimized over time as traffic patterns change. Updating hub selections more frequently (e.g., once a week) and using full-mesh communication matrices (described below) tend to lead to more stability (e.g., fewer changes to which of the PE routers PE1-PE5 are selected as hub routers). The example constraints 715 of FIG. 7 may be stored in any number and/or type(s) of memory(-ies) and/or memory device(s) using any number and/or type(s) of data structures.

To configure and/or provision hub and spoke routers, the example hub selector 350 of FIG. 7 includes a BGP policy manager 720. Based upon hub router selections made by the hub selection module 710, the example BGP policy manager 720 creates, generates, customizes, installs, configures and/or provisions corresponding BGP policies and/or configurations into the example PE routers PE1-PE5 of FIG. 3. Example BGP policies were described above in connection with FIG. 4.

While an example manner of implementing the example hub selector 350 of FIG. 3 has been illustrated in FIG. 7, one or more of the interfaces, data structures, elements, processes and/or devices illustrated in FIG. 7 may be combined, divided, re-arranged, omitted, eliminated and/or implemented in any other way. Further, the example traffic data collector 705, the example hub selection module 710, the example constraint database 715, the example BGP policy manager 720 and/or, more generally, the example hub selector 350 of FIG. 7 may be implemented by hardware, software, firmware and/or any combination of hardware, software and/or firmware. Thus, for example, any or all of the example traffic data collector 705, the example hub selection module 710, the example constraint database 715, the example BGP policy manager 720 and/or, more generally, the example hub selector 350 may be implemented by one or more circuit(s), programmable processor(s), ASIC(s), PLD(s) and/or FPLD(s), etc. When any of the appended claims are read to cover a purely software implementation, at least one of the example traffic data collector 705, the example hub selection module 710, the example constraint database 715, the example BGP policy manager 720 and/or, more generally, the example hub selector 350 are hereby expressly defined to include a tangible medium such as a memory, a DVD, a CD, etc. Further still, a border element may include interfaces, data structures, elements, processes and/or devices instead of, or in addition to, those illustrated in FIG. 7 and/or may include more than one of any or all of the illustrated interfaces, data structures, elements, processes and/or devices.

The example machine accessible instructions of FIG. 8 begins with the example traffic monitor 705 of FIG. 7 collecting traffic data for a VPN v from the example traffic monitor 360 of FIG. 3 (block 805). If it is not yet time to update hub router selections for the VPN v (block 810), control returns to block 805 to continue collecting traffic data.

When it is time to update a hub router selection (block 810), the example hub selection module 710 of FIG. 7 selects one or more hub routers subject to the example constraints 715 by, for example, carrying out any of the example pseudo-code of FIGS. 12, 16 and/or 18 (block 815). The example BGP policy manager 720 generates and sends hub router BGP policies to the selected hubs (block 820), and generates and sends spoke router BGP policies to the spoke routers (block 825). Control then exits from the example machine accessible instructions of FIG. 8.

Hub routers may be selected using any number and/or type(s) or method(s), logic and/or algorithm(s) subject to any number and/or type(s) of constraints and/or limits. Many network applications are client-server applications, with servers (e.g., database, mail, file servers, etc.) located at a few central locations. Moreover, many enterprise communications follow corporate structures and/or hierarchies. Under such conditions, the volume of traffic between the different pairs of PE routers of a VPN v is sparse, with a majority of traffic originating from and/or being directed to a small set of CE routers. Some pairs of PE routers of a VPN v will exchange very little, if any, traffic.

An example hub selection algorithm selects hub routers by identifying PE routers associated with larger volumes of traffic. Consider a PE router $p_i$ in a VPN v, and denote the aggregate of traffic volume received by $p_i$ from all customer sites directly connected to $p_i$ as $a_i^{in}$, and denote the aggregate volume of traffic sent by $p_i$ to all customer sites directly attached to $p_i$ as $a_i^{out}$. The PE router $p_i$ is selected as a hub router if $a_i^{in}$ or $a_i^{out}$ are sufficiently large compared to other PE routers. In particular, PE router $p_i$ is selected as a hub router if $$a_i^{in} \geq \alpha \sum_j a_j^{in} \text{ or } a_i^{out} \geq \alpha \sum_j a_j^{out} \qquad \text{EQN (1)}$$

where $\alpha$ is a tunable parameter between 0 and 1, inclusively. EQN (1) can be used as a basis of an optimization objective function that may be used to determine the optimal value of the volume threshold $\alpha$. Alternatively, EQN (1) can be analyzed numerically for different values of the volume threshold $\alpha$ to identify a value that is applicable across a set of VPNs. Although the above selects hub routers on a single VPN basis, an analogous approach where EQN (1) is computed for two or more VPNs to select hub routers for the two or more VPNs could be employed.

Figure 9:
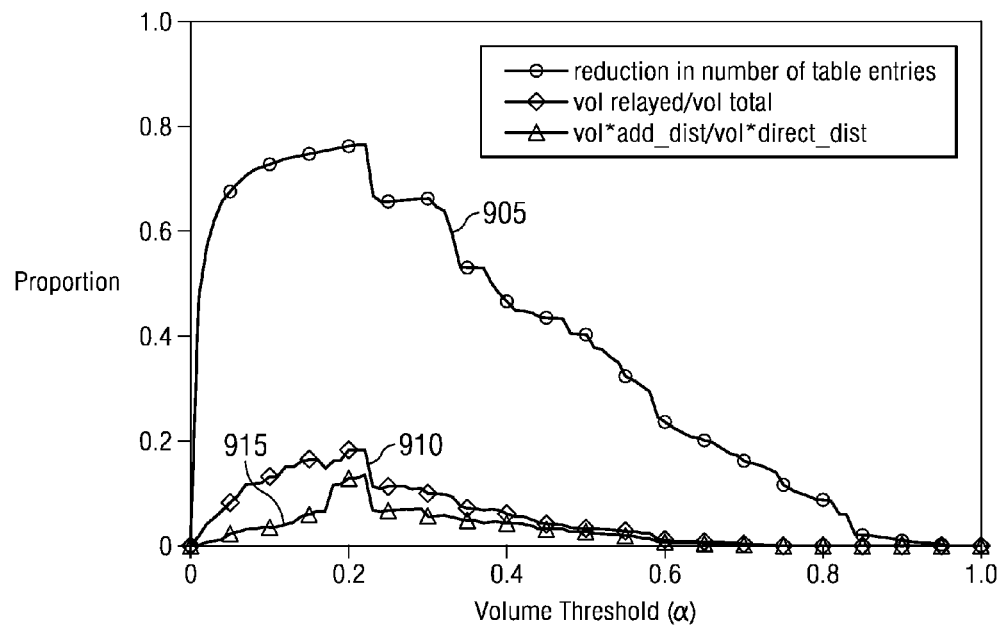
FIG. 9 illustrates example gains and costs resulting from selecting hubs using a volume-based hub selection algorithm.

FIG. 9 is a graph showing example gains and penalties resulting from hub selections made using the example algorithm of EQN (1). The example graphs of FIG. 9 represent data collected from an actual MPLS-based network implementing having a large number of PE routers and implementing numerous VPNs. A curve 905 represents a reduction in the number of VRF table entries. The example curve 905 represents the number of VRF table entries that can be eliminated by applying EQN (1) normalized (i.e., divided) by the number of VRF table entries when relaying is not used. A curve 910 represents the volume of relayed traffic normalized by the total amount of traffic. A curve 915 represents a sum of the products of (a) traffic volumes and (block) additional routing distances due to relaying, normalized by the sum of the products of (a) traffic volumes and (block) direct (i.e., shortest) distance routing. Such additional routing distances represent the length of additional communication paths traversed by a packet as a result of the packet being relayed through a hub router. As shown in FIG. 9, memory savings increase quickly as the number of hubs increases, which increases as $\alpha$ increases, with maximum savings reached when the value of $\alpha$ is between 0.1 and 0.2. While the memory savings increase rapidly, the volume of relayed traffic 910 and the volume-mile product 915 increase modestly. For some VPNs, if $\alpha$ is too large no or fewer hubs are selected and, thus, memory savings begin to decrease as illustrated in FIG. 9. Based on FIG. 9, a value $\alpha$ between 0.1 and 0.2 is generally applicable across different VPNs.

Figure 10:
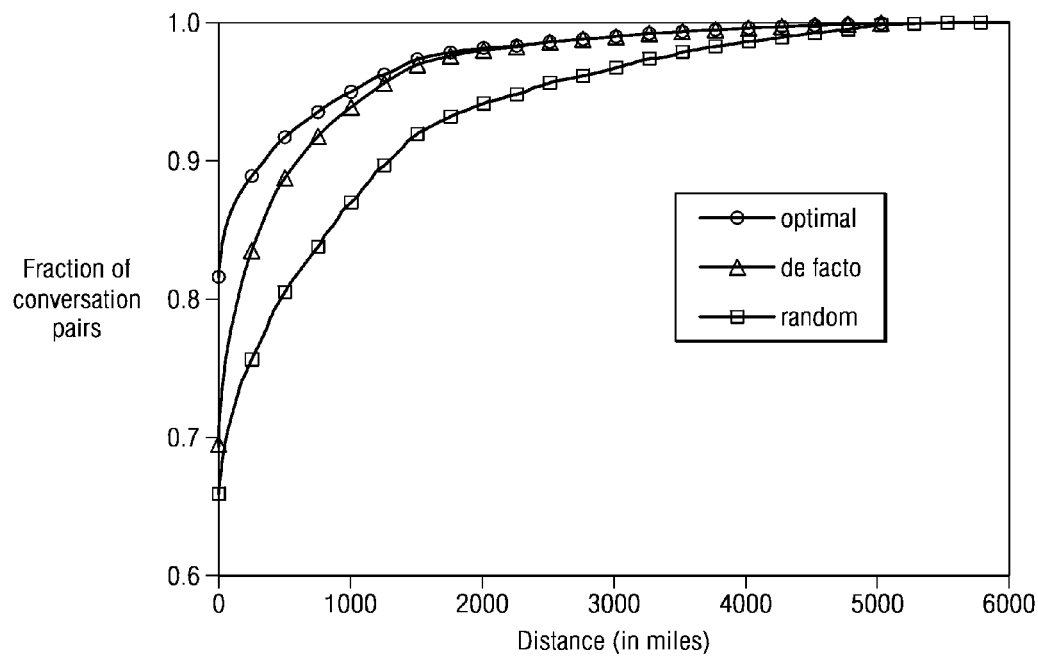
FIG. 10 illustrates example cumulative distribution functions (CDFs) of additional transport distances resulting from selection of hubs using a volume-based hub selection algorithm.

FIG. 10 is a graph illustrating example cumulative distribution functions (CDFs) of additional routing distances incurred due to relaying, with hubs selection performed using $\alpha$=0.1. Shown in FIG. 10 are three different curves corresponding to three different algorithms a spoke router can use to select its default hub. The different algorithms are: (a) the optimizing method where hub routers are assigned to spoke routers based on traffic statistics between the spoke router and the hub routers, (b) the de facto method where IGP distances are used by spoke routers to select their affiliated hub router, and (c) a random selection method where spoke routers selects their affiliated hub router randomly. Using the de facto hub selection method, approximately 70% of communicating pairs of PE routers experience no distance penalty due to routing. Further, around 94% of the pairs experience additional distances of less than 1000 miles, which can grow in the worst case to nearly 5000 miles. Since increasing a path length by 1000 miles leads to an increase in latency of approximately 11.5 milliseconds (ms) each way, the selection of hubs using the example method of EQN (1) may be unacceptable for some applications.

By factoring in the increased PE-to-PE latencies when selecting hub routers, the latency penalties resulting from the use of relaying may be substantially reduced. Let P denote the set of PE routers P={$p_1, p_2, \ldots, P_n$} in VPN v. Define a conversation matrix C=($c_{i,j}$) that represents historical communication between the routers in P, wherein $c_{i,j}$=1 if i≠j and $p_i$ transmitted traffic to $p_j$ during the measurement period, and $c_{i,j}$=0 otherwise. Define a latency matrix L=($l_{i,j}$) where $l_{i,j}$ is unidirectional communication latency (expressed in distance) from $p_i$ to $p_j$, with $l_{i,i}$=0 by definition. Let H ={$h_1, \ldots h_m$} (m≦n) be a subset of P denoting a set of hubs. Finally, define a mapping M: P→H that determines a hub $h_i$∈ H for each $p_i$∈ P. An example algorithm determines a smallest hub set H (i.e., a hub selection) and a corresponding mapping M (i.e., hub assignment) such that every communication between a pair of PEs of the VPN v adheres to the maximum allowable latency (in distance) threshold Θ. This can be mathematically expressed as:

$$\min |H| \forall s,d \text{ whose } c_{s,d}=1 \text{ such that } l_{s,M(s)} + l_{M(s),d} - l_{s,d} \leq \Theta \qquad \text{EQN(2)}$$

While in EQN (2), the additional latency is bounded, hub selections may be performed subject to a limit on maximum total one-way distance, or on both the additional one-way and total one-way distances.

Considering the any-to-any reachability model of the example MPLS-based VPN 300 of FIG. 3, the example hub selection algorithm of EQN (2) may, alternatively, be solved using a full-mesh conversation matrix $C_{full}$=($c_{i,j}^{full}$), where ∀ i, j (i≠j) $c_{i,j}^{full}$=1, $c_{i,i}^{full}$=0. Using $C^{full}$ rather than C imposes stricter constraints, potentially leading to lower memory savings. However, use of $C^{full}$ may reduce the likelihood that hub selections will require periodic or aperiodic adjustments. The use of the full-mesh conversation matrix $C^{full}$ rather than the traffic data based conversation matrix C is an application and/or service provider preference depending the desired a trade-off between increased stability and increased memory savings.

The example hub selection algorithm expressed by EQN (2) is NP-hard. However, an approximate solution may be obtained via a serve-use relationship graph and a greedy selection algorithm. Given a pair of PEs ($p_i, p_j$)∈ P, $p_i$ can serve $p_j$, or conversely $p_j$ can use $p_i$, if all conversations from $p_j$ to other PEs in the VPN v can be routed via $p_i$ as the hub without violating the latency constraint Θ. For each PE $p_i$ in P, we build two sets: (a) the serve set $S_i$ composed of PEs that $p_i$ can serve as a hub, and (b) the use set $U_i$ composed of PEs that can use $p_i$ as their hub. The serve set $S_i$ and the use set $U_i$ can be represented as a bipartite serve-use relationship graph.

Figure 11:
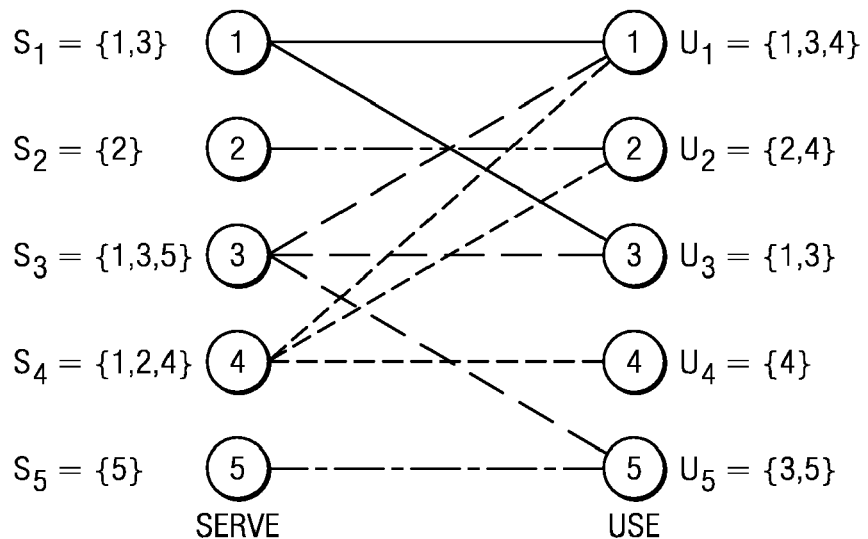
FIG. 11 illustrates an example serve-use relationship graph that may be used to select hubs using a latency-constrained hub selection algorithm.

FIG. 11 illustrates an example serve-use relationship graph for an example VPN having five PEs. On the left bank each node represents $p_i$ ∈ P in its role as a possible hub, and on the right bank each node represents $p_i$ ∈ P in its role as a potential spoke. The existence of a serve-use relationship between ($p_i, p_j$) ∈ P is represented by an edge between $p_i$ on the left bank and $p_j$ on the right bank.

The solution to EQN (2) may be obtained by finding the smallest number of nodes on the left bank (i.e., hubs) that can serve every node on the right bank. While such a problem statement is an instance of a so-called "set cover problem," which, again, is NP-hard, a good solution may be obtained using a greedy approximation strategy. At each stage, (i) greedily select the $p_i$ from the left bank whose serve set, $S_i$, is the largest, (ii) remove $p_i$ from the left bank, (iii) remove all $p_j$ (i ∈ $S_i$) from the right bank, (iv) update the mapping function M to indicate that the removed $p_j$ are assigned to hub $p_i$, and (v) revise the serve-use relationships for the remaining PEs in the graph. The above is repeated until no PEs remain on the right bank.

The above described hub selection algorithm assigns a particular hub to each spoke PE, and each spoke PE is assumed to use the assigned hub consistently for all packets. As described above, the hub assignment plan can be implemented by having the example BGP policy manager 720 of FIG. 7 generate customized BGP import policies so that spoke routers select their assigned hub. Additionally or alternatively, spoke routers may select hubs based on IGP distances. However, as illustrated below in connection with FIG. 13, such defactor selections may not satisfy the latency constraint Θ.

FIG. 12 illustrates example machine accessible instructions that may be executed to select hubs as described above in connection with EQN (2) and FIG. 11 and/or, more generally to implement the example hub selection module 710 of FIG. 7. The example machine accessible instructions of FIG. 12 may be carried out by a processor, a controller and/or any other suitable processing device. For example, the example machine accessible instructions of FIG. 12 may be embodied in coded instructions stored on a tangible medium such as a flash memory, a ROM and/or RAM associated with a processor (e.g., the example processor P105 discussed below in connection with FIG. 19). Alternatively, some or all of the example machine accessible instructions of FIG. 12 may be implemented using any combination(s) of ASIC(s), PLD(s), FPLD(s), discrete logic, hardware, firmware, etc. Also, some or all of the example machine accessible instructions of FIG. 12 may be implemented manually or as any combination of any of the foregoing techniques, for example, any combination of firmware, software, discrete logic and/or hardware. Further, many other methods of implementing the example operations of FIG. 12 may be employed. Additionally, any or all of the example machine accessible instructions of FIG. 12 may be carried out sequentially and/or carried out in parallel by, for example, separate processing threads, processors, devices, discrete logic, circuits, etc.

The example machine accessible instructions of FIG. 12 begin with construction of a serve-use relationship graph (lines 1-15) and continue with using a greedy approximation algorithm to select hubs based on the constructed serve-use relationship (lines 17-29). The example machine accessible instructions of FIG. 12 iterate over all pairs of PEs (lines 3 and 4), check whether the pair satisfies a latency constraint (lines 5-10), and if the pair satisfies the latency constraint (line 11) adds the pair to the corresponding serve and use sets (line 12). Lines 18-29 iterate until all PEs are served by a hub. As discussed above, for each iteration of lines 18-28, the PE on the left bank having the largest serve set is selected (line 22) and the serve-use relationship is updated based on the selected left bank PE (lines 23-28).

Figure 13:
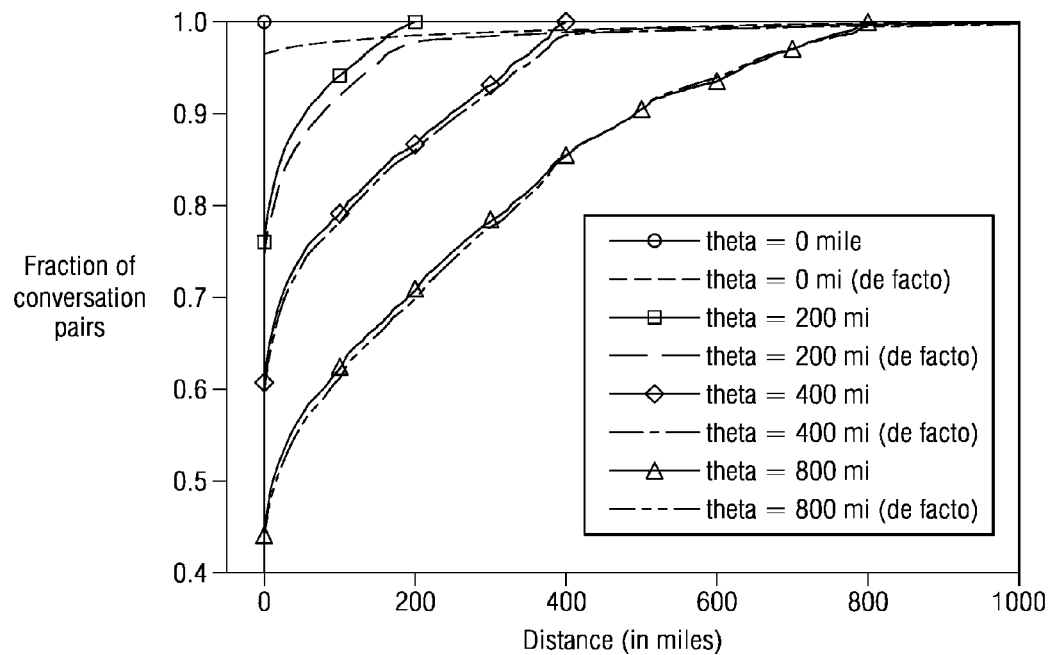
FIG. 13 illustrates example CDFs of additional transport distances resulting from selecting hubs using the example machine accessible instructions of FIG. 12.
Figure 14:
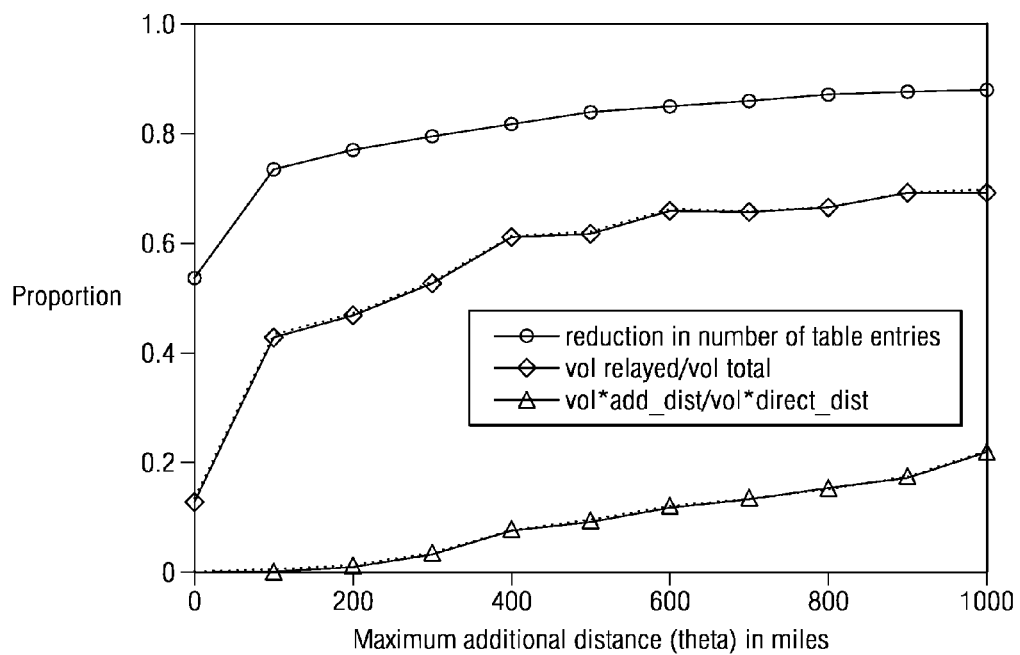
FIG. 14 illustrates example gains and costs resulting from selection of hubs using the example machine accessible instructions of FIG. 12.

FIG. 13 illustrates example CDFs of additional routing distances for all conversation pairs for different values of the latency constraints Θ. In the examples of FIGS. 13 and 14, hub selections are made using the example machine accessible instructions of FIG. 12. For each value of the latency constraint Θ, two curves are shown. A solid curve corresponding to spoke to hub assignments determined as described above, and a dotted curve corresponding to use of IGP distances (i.e., the defacto method). As shown in FIG. 13, when the specific hub assignments are used, the additional routing distances are strictly limited by the latency constraint Θ. However, with the de facto selection method some pairs have additional routing distances that violate the latency constraint Θ. However, for a reasonable value of Θ (e.g., 400 miles), the number of PE pairs exceeding Θ is approximately 1.3%. Meanwhile, the fraction of PE pairs exposed to unbearably large additional distances (e.g., 1000 miles) is only 0.2%, which amounts to a few tens of communication paths. Accordingly, the de facto method can be used in practice without undue concern regarding additional routing latencies.

FIG. 14 is a graph showing example gains and penalties resulting from hub selections made using the example machine accessible instructions of FIG. 12. As shown in FIG. 14, to achieve a roughly 80% memory savings, a PE pair need only tolerate an additional distance of up to 320 miles, which corresponds to an increase in unidirectional latency of just 3 ms. Moreover, when PE pairs can tolerate up to 1000 miles of additional latency, routing table memory can be reduced by approximately 88%. When no latency penalty is allowed (i.e., Θ=0), memory consumption can still be reduced by approximately 54%.

While not shown in FIG. 13 or FIG. 14, the use of a full-mesh conversation matrix $C^{full}$ results in similar results. For example, an additional routing latency of 480 miles (e.g., 5 ms of unidirectional latency) allows a memory consumption reduction of nearly 70%. Moreover, allowing no additional routing latency results in a memory savings of approximately 23%.

While the example method of FIG. 12 limits the additional routing latency, it may undesirably increase the volume of relayed traffic as seen by a comparison of FIGS. 9 and 14. To facilitate the incorporation of a constraint on relayed volume, define a volume matrix $V=(v_{i,j})$ for each VPN where $v_{i,j}$ denotes the amount of traffic volume that $p_i$ sends to $p_j$, where $v_{i,j}=0$ when $c_{i,j}=0$. The method of EQN (2) can be expanded to include a constraint on relayed volume, as expressed in the following mathematical expression:

$$\min |H| \text{ and } \sum_{\forall s,d} v_{s,d}(l_{s,M(s)} + l_{M(s),d} - l_{s,d}) \; \forall \; s, \qquad \text{EQN (3)}$$
$$d \text{ whose } c_{s,d} = 1 \text{ such that } l_{s,M(s)} + l_{M(s),d} - l_{s,d} \leq \Theta$$

Compared to the mathematical expression of EQN (2), EQN (3) incorporates a minimization of a volume-mile product $$\sum_{\forall s,d} v_{s,d}(l_{s,M(s)} + l_{M(s),d} - l_{s,d})$$

in addition to the minimization of the hub set H. However the minimization of hub set H conflicts with the minimization of the volume-mile product. For example, the latter is minimized when no PE routers are selected as hubs, which maximizes the former. Although both objective functions cannot be simultaneously minimized, a heuristic may be constructed that results in both a reasonably small hub set H and substantially reduces the volume of relayed traffic. An example heuristic algorithm is constructed similarly to the example algorithm described in connection with the example serve-use relationship graph of FIG. 11. During construction of the serve-use graph, a penalty value is computed for each PE. An example penalty $X_i$ of $p_i$ is defined as the sum of the volume and the additional distance products of all conversations in C, assuming $p_i$ is the sole hub in the VPN. The penalty $X_i$ can be mathematically expressed as:

$$X_i = \sum_{\forall s,d \text{ whose } c_{s,d}=1} v_{s,d}(l_{s,M(s)} + l_{M(s),d} - l_{s,d}) \qquad \text{EQN (4)}$$

Figure 15:
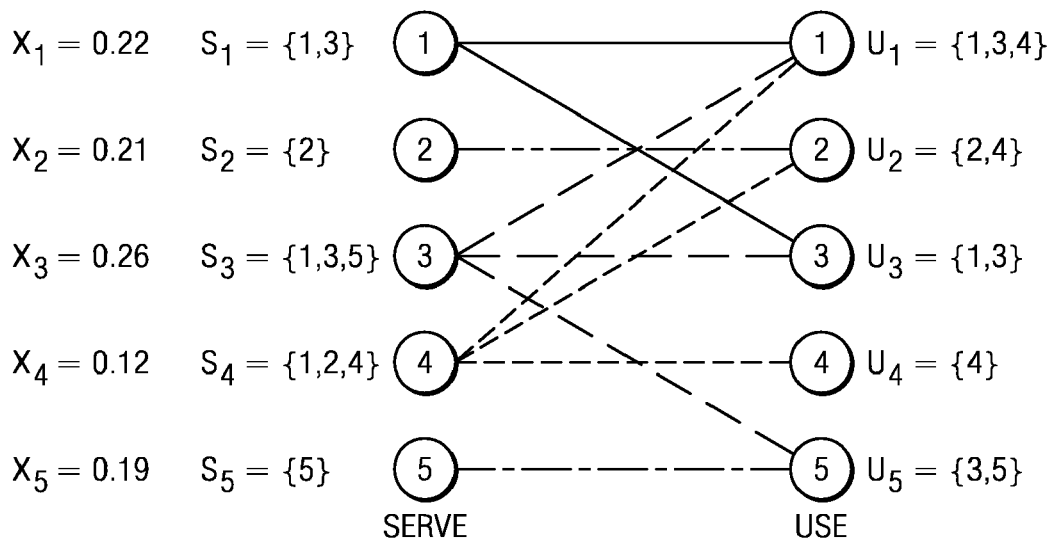
FIG. 15 illustrates an example serve-use relationship graph that may be used to select hubs using a latency-constrained, volume-sensitive hub selection algorithm.

FIG. 15 illustrates an example serve-use relationship graph for an example VPN having five PEs, where each PE is annotated with its penalty value $X_i$, each step of the hub selection process, the algorithm has to decide which of the objective functions to minimize. In an example algorithm, the left bank PE having the smallest penalty $X_i$ is selected (as opposed to the above algorithm where the left bank PE having the largest serve set $S_i$ was selected). In practice, it has been observed that choosing the left bank PE with the smallest penalty $X_i$ is often, if not always, conducive to reducing both objectives, namely, the volume-distance product and the hub set. Be definition, a penalty value $X_i$ of PE $p_i$ decreases when each product $V_{s,d}$ ($l_{s,M\;(s)}+l_{M\;(s),d}-l_{s,d}$) becomes smaller. Assume that a PE $p_i$ communicates with a large number of PEs. The penalty $X_i$ associated with such a high-span PE $p_i$ is usually low because the high-span PE $p_i$ is on the shortest path of many conversations, making many of the volume-distance products zero. As such, by selecting the left bank PE $p_i$ having the smallest penalty $X_i$, we are more likely to select a high-span PE. Often, such high-span PEs $p_i$ also have large serve sets $S_i$.

FIG. 16 illustrates example machine accessible instructions that may be executed to select hubs as described above in connection with EQN (3), EQN(4) and FIG. 15 and/or, more generally to implement the example hub selection module 710 of FIG. 7. The example machine accessible instructions of FIG. 16 may be carried out by a processor, a controller and/or any other suitable processing device. For example, the example machine accessible instructions of FIG. 16 may be embodied in coded instructions stored on a tangible medium such as a flash memory, a ROM and/or RAM associated with a processor (e.g., the example processor P105 discussed below in connection with FIG. 19). Alternatively, some or all of the example machine accessible instructions of FIG. 16 may be implemented using any combination(s) of ASIC(s), PLD(s), FPLD(s), discrete logic, hardware, firmware, etc. Also, some or all of the example machine accessible instructions of FIG. 16 may be implemented manually or as any combination of any of the foregoing techniques, for example, any combination of firmware, software, discrete logic and/or hardware. Further, many other methods of implementing the example operations of FIG. 16 may be employed. Additionally, any or all of the example machine accessible instructions of FIG. 16 may be carried out sequentially and/or carried out in parallel by, for example, separate processing threads, processors, devices, discrete logic, circuits, etc.

The example machine accessible instructions of FIG. 16 begin with construction of a serve-use relationship and with computing penalties $X_i$ for each serve side router (lines 1-16). The instructions then use a greedy approximation to select hubs by selecting the left bank PE (e.g., serve side) having the smallest penalty $X_i$ (lines 18-30). The example machine accessible instructions of FIG. 16 iterate over all pairs of PEs (lines 3 and 4), compute the penalty $X_i$ (line 7), check whether the pair satisfies a latency constraint (lines 8-10) and, if the pair satisfies the latency constraint, adds the pair to the corresponding serve and use sets (lines 12-14). Lines 19-30 iterate until all PEs are served by a hub. At each iteration, the PE on the left bank having the smallest penalty $X_i$ is selected (line 23) and the serve-use relationship is updated based on the selected left bank PE (lines 24-29).

FIG. 17 is a graph showing example gains and penalties resulting from hub selections made using the example machine accessible instructions of FIG. 16. As shown in FIG. 17, the memory savings are significant, however, the volume of relayed traffic is substantially lower than the volume of relayed traffic resulting from the example machine accessible instructions of FIG. 12 (FIG. 14). In the example graph of FIG. 17, the relayed volume never exceeds 40% for almost all latency constraints Θ. However, the example relayed volume of FIG. 14 exceeds 40% for nearly all values of Θ, and reaches nearly 70% when Θ=1000 miles. The example memory savings of FIG. 17 are only slightly lower (e.g., 1 to 3%) than those of FIG. 14. As with the example machine accessible instructions of FIG. 12, when a full-mesh conversation matrix is used, the memory savings are somewhat reduced. However, memory savings of 22% to 75% can be achieved for latency constraints Θ in the few hundred mile range. However, the amount of additional relayed volume, when the full-mesh conversation matrix is used, is improved as compared to the example machine accessible instructions of FIG. 12.

Yet another example hub selection algorithm can be expressed as:

$$\min F|H| + \sum_{\forall s} \max\left\{\sum_{\forall d} v_{s,d}(l_{s,M(s)} + l_{M(s),d} - l_{s,d}), 0\right\} \quad \text{EQN (5)}$$

$\forall s, d$ whose $c_{s,d} = 1$ such that $l_{s,M(s)} + l_{M(s),d} - l_{s,d} \le \Theta$ where F is a fixed parameter that represents hub installation cost in terms of bandwidth usage. In other words, F represents how much a reduction in the number of hubs is worth in terms of bandwidth utilization. The example algorithm of EQN (5) can be solved using, for example, the example machine accessible instructions of FIG. 18. The example machine accessible instructions of FIG. 18 solves EQN (5) using a greedy selection algorithm similar to that described above in connection with FIGS. 12 and 15. In the example machine accessible instructions of FIG. 18, each PE has a capacity Cap that represents the maximum number of routers that can use this PE as a hub. The value of the capacity Cap can be the number of PE routers when there is no concern of creating a "hot spot" where a large volume of traffic relayed through a small number of hubs.

FIG. 18 illustrates example machine accessible instructions that may be executed to select hubs as described above in connection with EQN (5) and/or, more generally, to implement the example hub selection module 710 of FIG. 7. The example machine accessible instructions of FIG. 18 may be carried out by a processor, a controller and/or any other suitable processing device. For example, the example machine accessible instructions of FIG. 18 may be embodied in coded instructions stored on a tangible medium such as a flash memory, a ROM and/or RAM associated with a processor (e.g., the example processor P105 discussed below in connection with FIG. 19). Alternatively, some or all of the example machine accessible instructions of FIG. 18 may be implemented using any combination(s) of ASIC(s), PLD(s), FPLD(s), discrete logic, hardware, firmware, etc. Also, some or all of the example machine accessible instructions of FIG. 18 may be implemented manually or as any combination of any of the foregoing techniques, for example, any combination of firmware, software, discrete logic and/or hardware. Further, many other methods of implementing the example operations of FIG. 18 may be employed. Additionally, any or all of the example machine accessible instructions of FIG. 18 may be carried out sequentially and/or carried out in parallel by, for example, separate processing threads, processors, devices, discrete logic, circuits, etc.

The example machine accessible instructions of FIG. 18 begin with construction of a serve-use relationship (lines 1805) and with computing costs for each serve side router (line 1810). The instructions then use a greedy approximation to select hubs by selecting the left bank PE (e.g., serve side) having the smallest penalty $X_l$ (line 1815). The instructions then add Cap number of use side PE routers to a hub set (line 1820) and selects the generated hub set if it is lower cost than a previous hub set (lines 1825).

Figure 19:
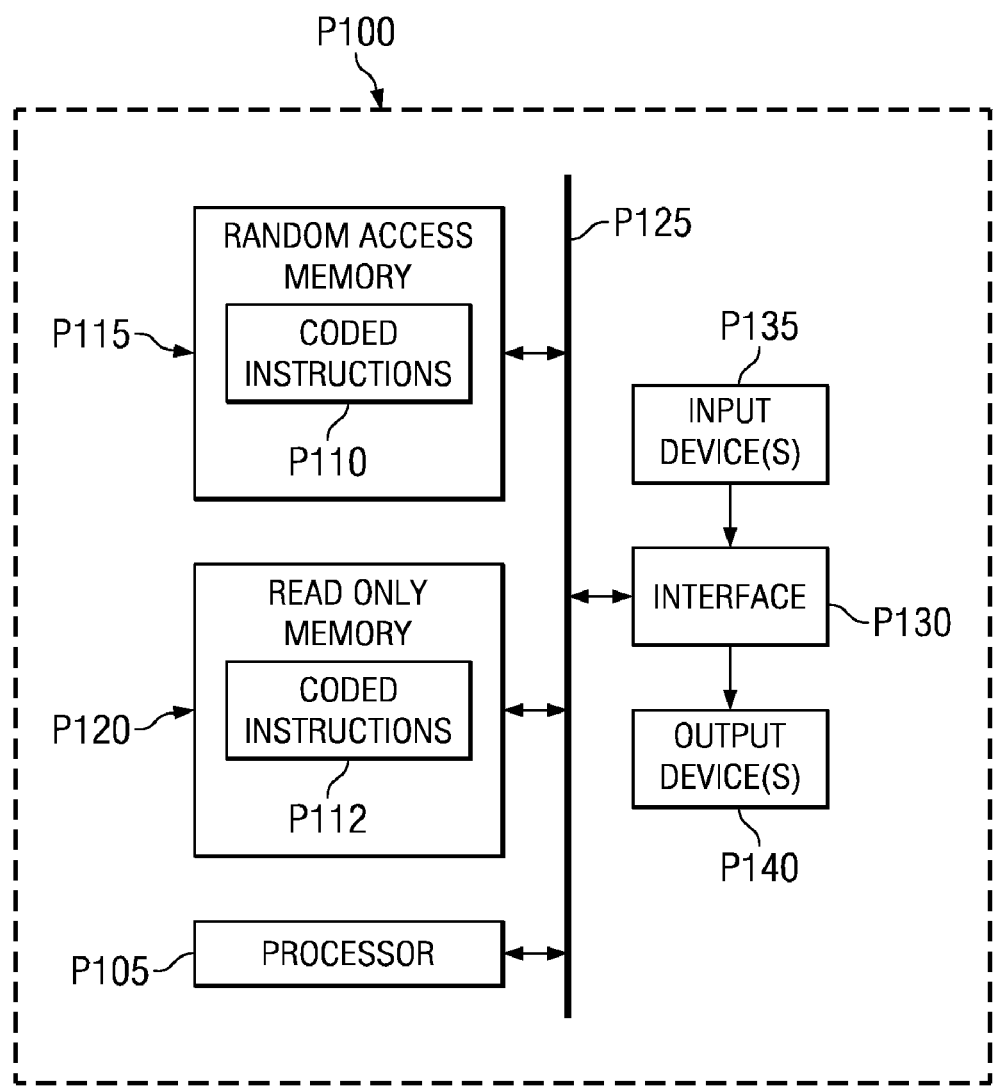
FIG. 19 is a schematic illustration of an example processor platform that may be used and/or programmed to carry out the example machine accessible instructions of FIGS. 6, 8, 12, 16 and/or 18 to implement any of all of the methods and apparatus disclosed herein.

FIG. 19 is a schematic diagram of an example processor platform P100 that may be used and/or programmed to implement any or all of the example PE routers PE1-PE5, the example hub selector 350 and/or the example traffic monitor 360 of FIGS. 3, 4, 5 and/or 7. For example, the processor platform P100 can be implemented by one or more general-purpose processors, processor cores, microcontrollers, etc.

The processor platform P100 of the example of FIG. 19 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example protocol message exchanges and/or the example machine accessible instructions of FIGS. 6, 8, 12, 16 and/or 18 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement any or all of the example VRF table(s) 515, the example BGP policy(-ies) 525, and/or the example constraint database 715.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the example NIC 505 of FIG. 5.

Of course, the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   collecting traffic statistics from a plurality of provider edge (PE) routers of a multiprotocol label switching based virtual private network (VPN); and
   using the traffic statistics to select a first PE router of the plurality of PE routers as a hub router and a second PE router of the plurality of PE routers as a spoke router, the first PE router to have a full virtual routing and forwarding (VRF) table referencing a first set of customer edge (CE) routers coupled via the VPN, the second PE router to have a truncated VRF table referencing only the first PE router and any CE routers coupled to the VPN via the second PE router.

2. A method as defined in claim 1, further comprising:
   configuring the first PE router with a first policy that defines exporting a first value representing the first PE router and a second value representing a customer edge (CE) router coupled to the VPN via the first PE router, and importing a third value representing a second CE router coupled to the VPN via the second PE router; and
   configuring the second PE router with a second policy that defines exporting the third value, and importing the first value to the first PE router.

3. A method as defined in claim 1, wherein selecting the first PE router of the plurality of PE routers as the hub router comprises:
   computing a plurality of input volumes for respective ones of the plurality of PE routers;
   computing a sum of the plurality of input volumes; and
   comparing a first of the plurality of input volumes to a sum of the plurality of input volumes.

4. A method as defined in claim 1, wherein selecting the first PE router of the plurality of PE routers as the hub router comprises:
   determining for each of the PE routers a respective set of the plurality of PE routers that can be served based on a latency constraint; and
   comparing the sizes of the respective sets.

5. A method as defined in claim 1, wherein selecting the first PE router of the plurality of PE routers to act as the hub router comprises:
   determining for each of the PE routers a respective set of the plurality of PE routers that can be served based on a latency constraint;
   computing a plurality of latency-volume penalties for respective ones of the plurality of PE routers; and
   comparing the latency-volume penalties.

6. A method as defined in claim 5, wherein computing a latency-volume penalty of a PE router comprises:
   computing for each member of the associated set of PE routers a respective product of a volume and a latency difference; and
   computing a sum of the respective products.

7. A method as defined in claim 1, wherein the first PE router is selected as a hub router based on at least one of a hub installation cost, or an allowable number of the plurality of PE routers that can use the first PE router as the hub router.

8. A hub selector comprising:
   a traffic data collector to collect traffic statistics from a plurality of provider edge (PE) routers of a multiprotocol label switching based virtual private network (VPN);
   a hub selection module to select, based on the traffic statistics, a first PE router of the plurality of PE routers as a hub router and a second PE router of the plurality of PE routers as a spoke router; and
   a border gateway protocol policy manager to:
      configure the first PE router with a first policy that defines exporting a value representing the first PE router and a second value representing a customer edge (CE) router coupled to the VPN via the first PE router, and importing a third value representing a second CE router coupled to the VPN via the second PE router; and
      configure the second PE router with a second policy that defines exporting the third value, and importing the first value.

9. A hub selector as defined in claim 8, wherein the hub selection module is to select the first PE router based on at least one of a first input traffic volume associated with the first PE router, a second input traffic volume associated with the second PE router, a first output traffic volume associated the first PE router, a second output traffic volume associated with the second PE router, a maximum latency, or a maximum additional routing distance.

10. A non-transitory article of manufacture storing machine readable instructions which, when executed, cause a machine to:
   collect traffic statistics from a plurality of provider edge (PE) routers of a multiprotocol label switching based virtual private network (VPN); and
   use the traffic statistics to select a first PE router of the plurality of PE routers as a hub router and a second PE router of the plurality of PE routers as a spoke router, the first PE router to have a full virtual routing and forwarding (VRF) table referencing a first set of customer edge (CE) routers coupled via the VPN, the second PE router to have a truncated VRF table referencing only the first PE router and any CE routers coupled to the VPN via the second PE router.

11. A non-transitory article of manufacture as defined in claim 10, wherein the machine readable instructions, when executed, cause the machine to:

configure the first PE router with a first policy that defines exporting a first value representing the first PE router and a second value representing a customer edge (CE) router coupled to the VPN via the first PE router, and importing a third value representing a second CE router coupled to the VPN via the second PE router; and configure the second PE router with a second policy that defines exporting the third value, and importing the first value to the first PE router.

12. A non-transitory article of manufacture as defined in claim 10, wherein the machine readable instructions, when executed, cause the machine to selecting the first PE router of the plurality of PE routers to act as the hub router by:

determining for each of the PE routers a respective set of the plurality of PE routers that can be served based on a latency constraint;

computing a plurality of latency-volume penalties for respective ones of the plurality of PE routers; and comparing the latency-volume penalties.

* * * * *